(12) United States Patent
Suzuki et al.

(10) Patent No.: US 11,987,284 B2
(45) Date of Patent: May 21, 2024

(54) VEHICLE AND AUTONOMOUS DRIVING KIT

(71) Applicant: TOYOTA JIDOSHA KABUSHIKI KAISHA, Toyota (JP)

(72) Inventors: Ikuma Suzuki, Okazaki (JP); Satoshi Katoh, Toyota (JP); Ryo Irie, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/098,822

(22) Filed: Jan. 19, 2023

(65) Prior Publication Data

US 2023/0159101 A1    May 25, 2023

Related U.S. Application Data

(63) Continuation of application No. 17/722,644, filed on Apr. 18, 2022, now Pat. No. 11,628,880, which is a
(Continued)

(30) Foreign Application Priority Data

Jan. 31, 2020 (JP) ................................. 2020-015726

(51) Int. Cl.
*B62D 15/02* (2006.01)
*B60W 30/182* (2020.01)
(Continued)

(52) U.S. Cl.
CPC ......... *B62D 15/021* (2013.01); *B60W 30/182* (2013.01); *B60W 50/12* (2013.01);
(Continued)

(58) Field of Classification Search
CPC . B62D 15/021; B62D 15/025; B60W 30/182; B60W 50/12; B60W 60/001;
(Continued)

(56) References Cited

U.S. PATENT DOCUMENTS 10,513,184 B2   12/2019  Lee et al.
11,238,133 B1*   2/2022  Brewer ............. A61M 5/14248
(Continued)

FOREIGN PATENT DOCUMENTS

JP    2011-207407    10/2011
JP    2015-138330     7/2015
(Continued)

OTHER PUBLICATIONS

Office Action dated Sep. 19, 2022 in U.S. Appl. No. 17/154,017.
(Continued)

*Primary Examiner* — Tyler D Paige
(74) *Attorney, Agent, or Firm* — Oblon, McClelland, Maier & Neustadt, L.L.P.

(57) ABSTRACT

A vehicle includes an ADK attachable to and removable from a vehicle main body, the ADK issuing an instruction for autonomous driving, a VP including a plurality of functional units that perform a plurality of prescribed functions of the vehicle main body, and a VCIB that issues a control instruction to the functional units in accordance with an instruction from the ADK. One of the plurality of functional units is a steering system that steers the vehicle main body. The steering system specifies a limit value of a steering rate in accordance with a prescribed reference and transmits the specified limit value to the ADK through the VCIB. The ADK calculates a target steering angle to satisfy the limit value received from the steering system and transmits an instruction for the calculated steering angle to the steering system through the VCIB.

20 Claims, 18 Drawing Sheets

Related U.S. Application Data continuation of application No. 17/154,017, filed on Jan. 21, 2021, now abandoned.

(51) Int. Cl.
*B60W 50/12* (2012.01)
*B60W 60/00* (2020.01)

(52) U.S. Cl.
CPC ... *B60W 60/001* (2020.02); *B60W 2510/0638* (2013.01); *B60W 2510/205* (2013.01)

(58) Field of Classification Search
CPC ... B60W 2510/0638; B60W 2510/205; B60W 60/00; B60W 10/20; B60W 2710/207; B60W 60/0023; B60W 40/105; B60W 40/107; B60W 2050/0002; B60W 2520/10; B60W 2540/18; B60W 10/06; B60W 10/184; B60W 30/16; B60W 40/00; B60W 40/08; B60R 16/033; G05D 1/0005; Y02T 10/70; G08G 1/00
USPC ............................................. 701/41
See application file for complete search history.

(56) References Cited

U.S. PATENT DOCUMENTS

| | | | |
|---|---|---|---|
| 11,364,935 B2* | 6/2022 | El-Bahrawy | G06F 30/20 |
| 2016/0167653 A1 | 6/2016 | Malone et al. | |
| 2016/0313735 A1 | 10/2016 | Berkemeier | |
| 2016/0377508 A1 | 12/2016 | Perrone et al. | |
| 2018/0088577 A1 | 3/2018 | Kim et al. | |
| 2018/0265019 A1 | 9/2018 | Dry et al. | |
| 2019/0061773 A1* | 2/2019 | Reed | B62D 1/00 |
| 2019/0303557 A1 | 10/2019 | Ando | |
| 2023/0376029 A1* | 11/2023 | Kobayashi | G05D 1/0027 |

FOREIGN PATENT DOCUMENTS

| | | |
|---|---|---|
| JP | 2018-132015 A | 8/2018 |
| JP | 2019-127081 | 8/2019 |

OTHER PUBLICATIONS

Nanba et al. "Study on Pre-Deceleration Running in Encounters with Emergency Vehicles Using Vehicle to Vehicle Communications", International Journal of Intelligent Transportation Systems Reseach, vol. 18, 2019, pp. 381-390.

Astrom, et al. "Vehicle Steering", Jul. 23, 2019, http://python-control.readthedocs.io/, 20 pages.

* cited by examiner

FIG.7

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

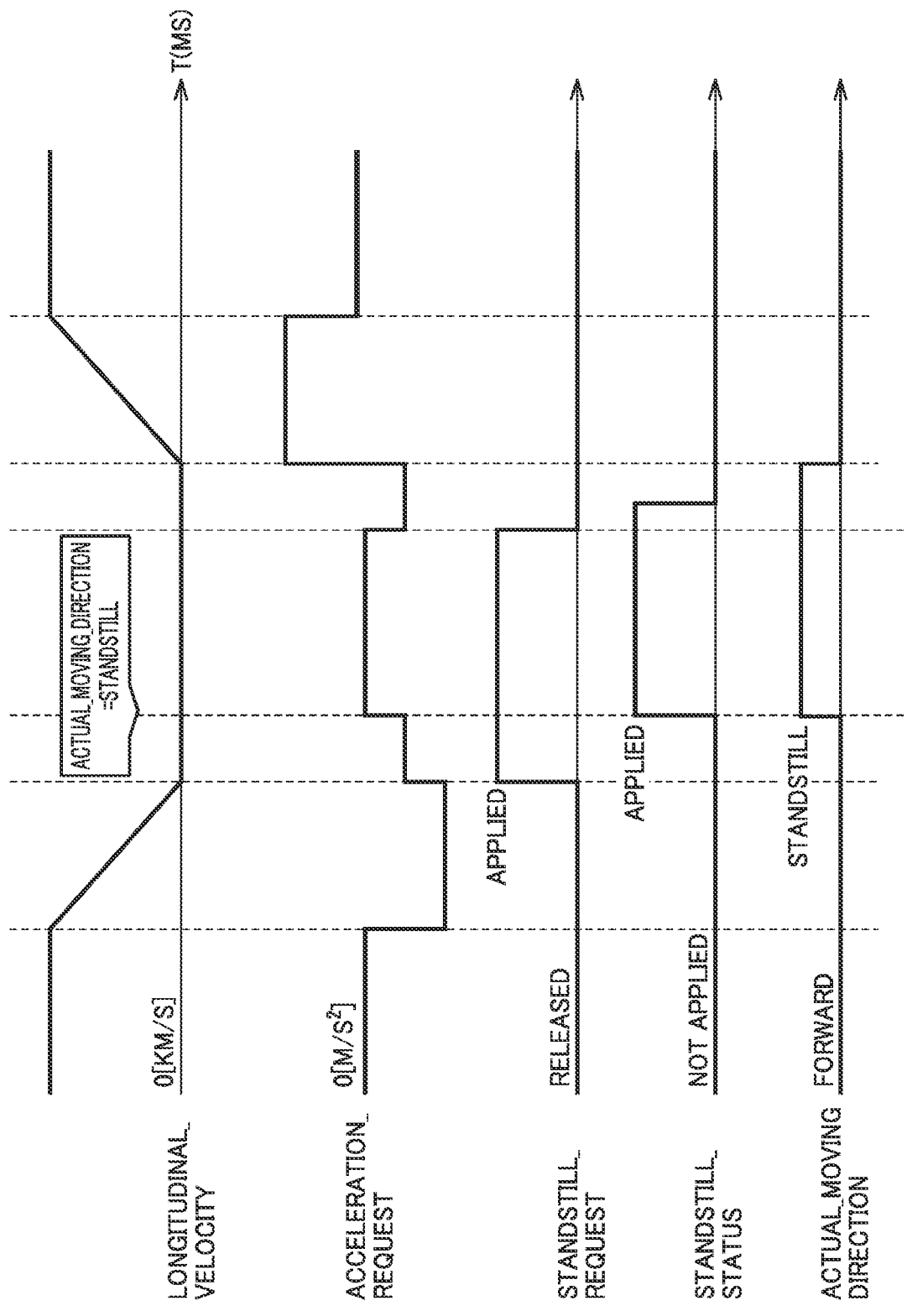

VEHICLE AND AUTONOMOUS DRIVING KIT

This is a continuation of U.S. application Ser. No. 17/722,644, filed on Apr. 18, 2022, which is a continuation of U.S. application Ser. No. 17/154,017, filed on Jan. 21, 2021, which is based on Japanese Patent Application No. 2020-015726 filed with the Japan Patent Office on Jan. 31, 2020, the entire contents of which are hereby incorporated by reference.

BACKGROUND

Field

The present disclosure relates to a vehicle and an autonomous driving kit and particularly to a vehicle capable of autonomous driving and an autonomous driving kit that issues an instruction for autonomous driving of a vehicle and is attachable to and removable from the vehicle.

Description of the Background Art

A technique for autonomous driving of a vehicle has recently been developed. For example, a vehicle in which an autonomous driving electronic control unit (ECU) that issues an instruction for autonomous driving controls autonomous driving is available (see, for example, Japanese Patent Laying-Open No. 2018-132015). In such a vehicle, a reference for a limit value of a steering rate on a vehicle side may be incorporated in advance in the autonomous driving ECU. The autonomous driving ECU can thus steer the vehicle within a range between limit values of the steering rate adapted to the vehicle.

SUMMARY

In the vehicle in Japanese Patent Laying-Open No. 2018-132015, an autonomous driving apparatus that issues an instruction for autonomous driving, such as the autonomous driving ECU, may be attachable to and removable from the vehicle, and the autonomous driving apparatus may be replaceable with an autonomous driving apparatus of another specification. When the vehicle is configured as such, however, unless an appropriate limit value of a steering rate suitable for the vehicle is incorporated in advance in the autonomous driving apparatus, the limit value of the steering rate cannot be controlled to an appropriate value.

The present disclosure was made to solve such a problem, and an object of the present disclosure is to provide a vehicle in which, when an attachable and removable apparatus that issues an instruction for autonomous driving controls a vehicle, a limit value of a steering rate can be set to an appropriate value suitable for the vehicle without storing in advance the limit value of the steering rate in this apparatus.

A vehicle according to the present disclosure is capable of autonomous driving and includes an autonomous driving kit attachable to and removable from the vehicle, the autonomous driving kit issuing an instruction for autonomous driving, a vehicle platform including a plurality of functional units that perform a plurality of prescribed functions of the vehicle, and a vehicle interface box that communicates with the autonomous driving kit and issues a control instruction to the functional units in accordance with an instruction from the autonomous driving kit. One of the plurality of functional units is a steering system that steers the vehicle. The steering system specifies a limit value of a steering rate in accordance with a prescribed reference and transmits the specified limit value to the autonomous driving kit through the vehicle interface box. The autonomous driving kit calculates a target steering angle to satisfy the limit value received from the steering system and transmits an instruction for the calculated steering angle to the steering system through the vehicle interface box.

According to such a configuration, the limit value of the steering rate for calculating the target steering angle is conveyed from a side of the vehicle platform to the autonomous driving kit. Consequently, a vehicle in which, when an attachable and removable autonomous driving kit that issues an instruction for autonomous driving controls the vehicle, the limit value of the steering rate can be set to an appropriate value suitable for the vehicle without storing the limit value of the steering rate in advance in the autonomous driving kit can be provided.

The steering system may switch the prescribed reference in accordance with a vehicle speed. The prescribed reference may be such a reference that the limit value of the steering rate is defined as a prescribed angular velocity when the vehicle speed is lower than a prescribed speed. A value of the prescribed angular velocity may be 0.4 rad/s.

The prescribed reference may be such a reference that, when the vehicle speed exceeds a prescribed speed, the limit value of the steering rate satisfies predetermined relation between the vehicle speed and the limit value of the steering rate. A value of the prescribed speed may be 10 km/h.

Preferably, the prescribed reference may be a reference determined in advance such that a lateral jerk of the vehicle is lower than a prescribed jerk. A value of the prescribed jerk may be 2.94 m/s$^3$.

According to another aspect of this disclosure, an autonomous driving kit issues an instruction for autonomous driving of a vehicle and is attachable to and removable from the vehicle. The vehicle includes a plurality of functional units that perform a plurality of prescribed functions of the vehicle and the functional units are controlled in accordance with an instruction from the autonomous driving kit. One of the plurality of functional units is a steering system that steers the vehicle. The autonomous driving kit calculates a target steering angle to satisfy a limit value of a steering rate specified by the steering system in accordance with a prescribed reference and transmits an instruction for the calculated steering angle to the steering system through a vehicle interface box.

According to such a configuration, in an example where an attachable and removable autonomous driving kit that issues an instruction for autonomous driving controls a vehicle, an autonomous driving kit with which a limit value of a steering rate can be set to an appropriate value suitable for the vehicle without storing the limit value of the steering rate in advance in the autonomous driving kit can be provided.

According to yet another aspect of this disclosure, a vehicle is capable of autonomous driving and includes a vehicle platform and a vehicle interface box, the vehicle platform including a plurality of functional units that perform a plurality of prescribed functions of the vehicle, the vehicle interface box communicating with an autonomous driving kit that issues an instruction for autonomous driving and is attachable to and removable from the vehicle, the vehicle interface box issuing a control instruction to the functional units in accordance with an instruction from the autonomous driving kit. One of the plurality of functional units is a steering system that steers the vehicle. The steering system specifies a limit value of a steering rate in accordance with a prescribed reference, transmits the specified limit value to the autonomous driving kit through the vehicle interface box, and controls a steering angle in accordance with an instruction for a target steering angle calculated by the autonomous driving kit to satisfy the limit value received from the steering system.

According to such a configuration, a vehicle in which, when an attachable and removable autonomous driving kit that issues an instruction for autonomous driving controls the vehicle, the limit value of the steering rate can be set to an appropriate value suitable for the vehicle without storing the limit value of the steering rate in advance in the autonomous driving kit can be provided.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram showing a typical flow in an autonomous driving system.

FIG. 8 is a diagram showing an exemplary timing chart of an API relating to stop and start of the MaaS vehicle.

DESCRIPTION OF THE PREFERRED EMBODIMENTS

Figure 1:
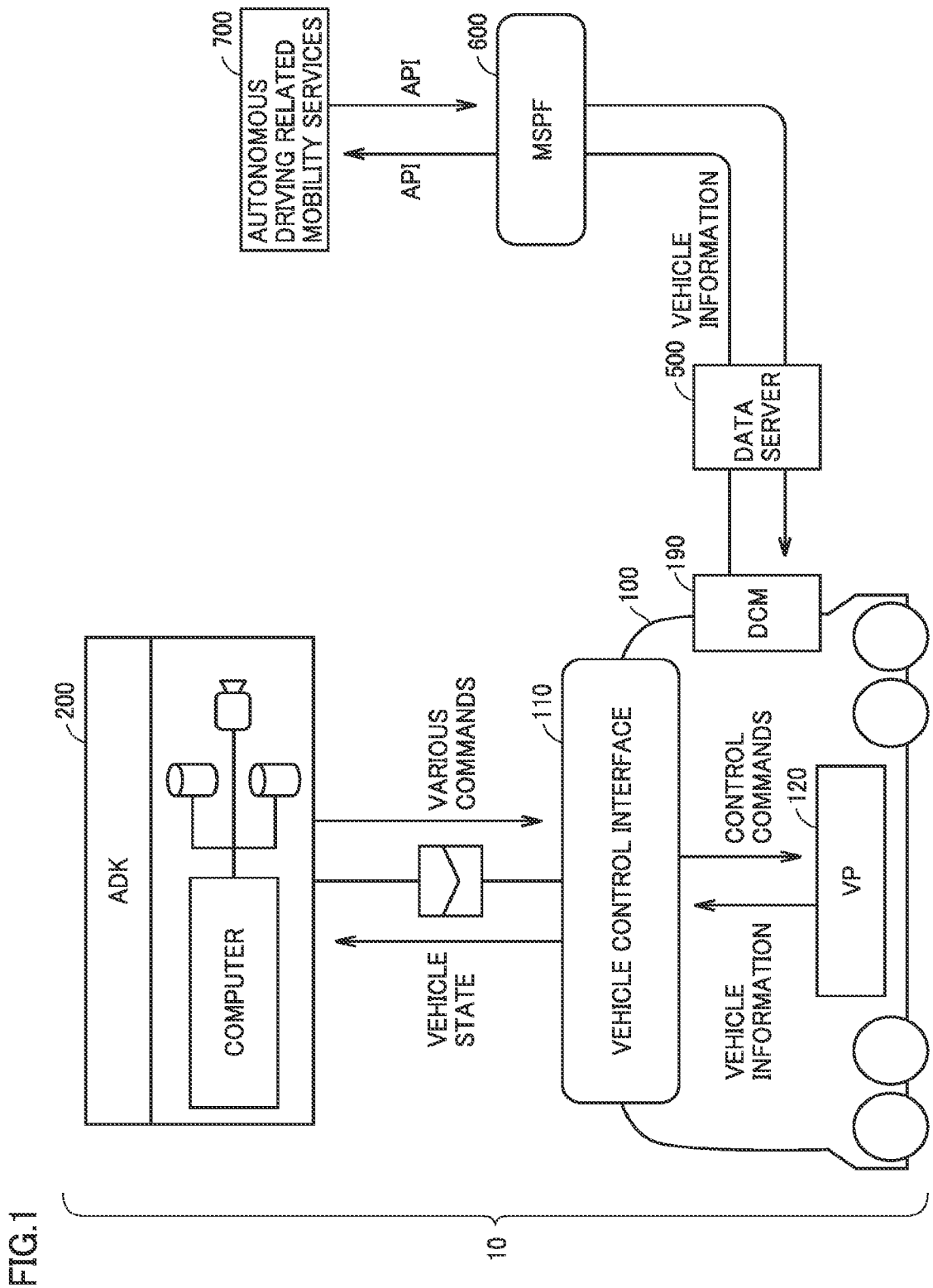
FIG. 1 is a diagram showing overview of a mobility as a service (MaaS) system in which a vehicle according to an embodiment of the present disclosure is used.

An embodiment of the present disclosure will be described below in detail with reference to the drawings. The same or corresponding elements in the drawings have the same reference characters allotted and description thereof will not be repeated.

FIG. 1 is a diagram showing overview of a MaaS system in which a vehicle according to an embodiment of the present disclosure is used. Referring to FIG. 1, this MaaS system includes a vehicle 10, a data server 500, a mobility service platform (which is denoted as "MSPF" below) 600, and autonomous driving related mobility services 700.

Vehicle 10 includes a vehicle main body 100 and an autonomous driving kit (which is denoted as "ADK" below) 200. Vehicle main body 100 includes a vehicle control interface 110, a vehicle platform (which is denoted as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by driving by a user. In this case, VP 120 carries out travel control (travel control in accordance with an operation by a user) in a manual mode.

Vehicle control interface 110 can communicate with ADK 200 over a controller area network (CAN). Vehicle control interface 110 receives various commands from ADK 200 or outputs a state of vehicle main body 100 to ADK 200 by executing a prescribed application program interface (API) defined for each communicated signal.

When vehicle control interface 110 receives a command from ADK 200, it outputs a control command corresponding to the received command to VP 120. Vehicle control interface 110 obtains various types of information on vehicle main body 100 from VP 120 and outputs the state of vehicle main body 100 to ADK 200. A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is denoted as "ADS" below) for autonomous driving of vehicle 10. ADK 200 creates, for example, a driving plan of vehicle 10 and outputs various commands for traveling vehicle 10 in accordance with the created driving plan to vehicle control interface 110 in accordance with the API defined for each command. ADK 200 receives various signals indicating states of vehicle main body 100 from vehicle control interface 110 in accordance with the API defined for each signal and has the received vehicle state reflected on creation of the driving plan. A configuration of ADK 200 (ADS) will also be described later.

DCM 190 includes a communication interface (I/F) for vehicle main body 100 to wirelessly communicate with data server 500. DCM 190 outputs various types of vehicle information such as a speed, a position, or an autonomous driving state to data server 500. DCM 190 receives from autonomous driving related mobility services 700 through MSPF 600 and data server 500, for example, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS, and an ADS provider can use as the APIs, the data on the vehicle states and vehicle control necessary for development of the ADS stored in data server 500.

Figure 2:
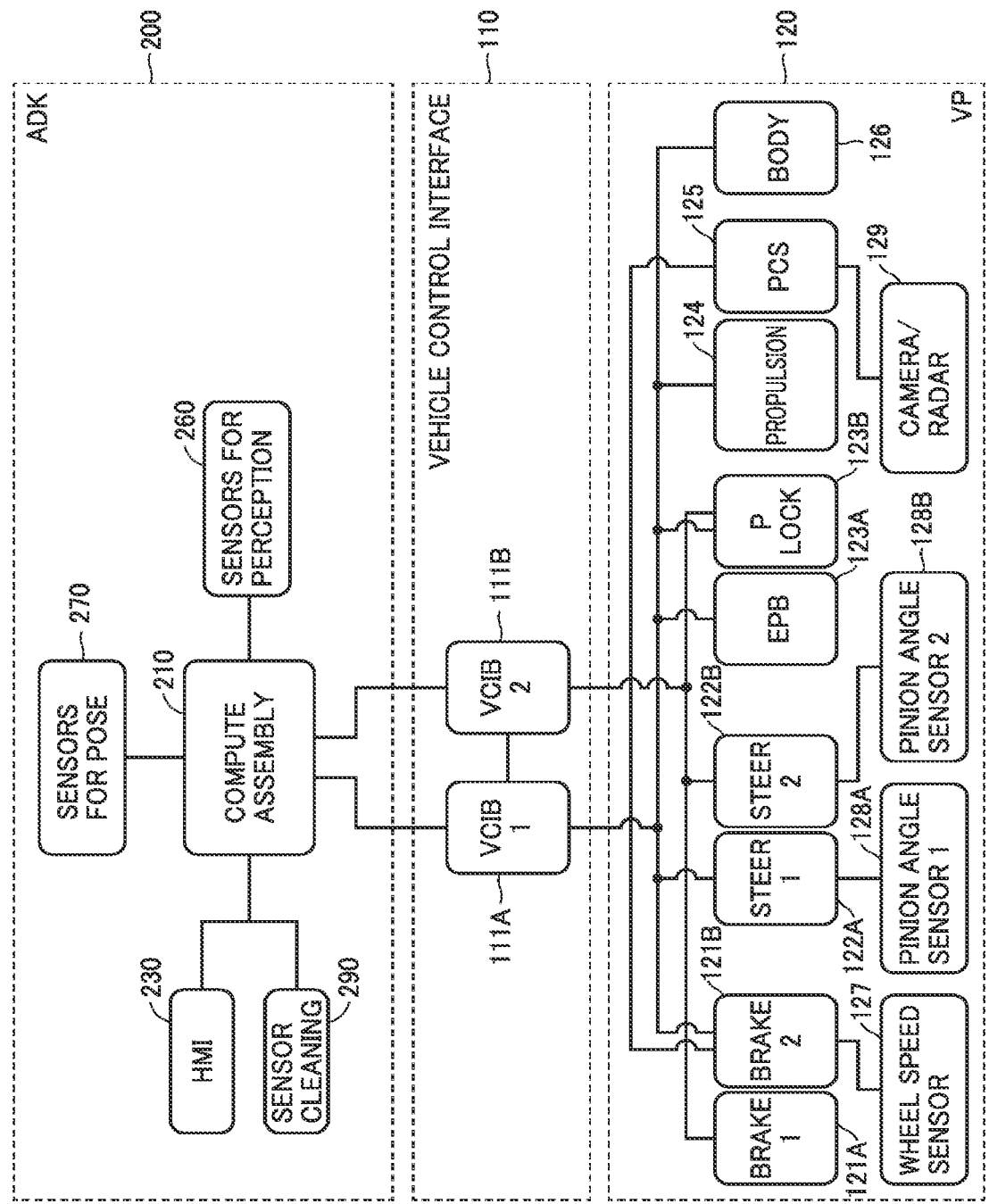
FIG. 2 is a diagram showing overview of a configuration of the vehicle in this embodiment.

FIG. 2 is a diagram showing overview of a configuration of the vehicle in this embodiment. As shown in FIG. 2, ADK 200 includes a compute assembly 210, a human machine interface (HMI) 230, sensors for perception 260, sensors for pose 270, and a sensor cleaning 290.

Compute assembly 210 contains a central processing unit (CPU) and a memory (including, for example, a read only memory (ROM) and a random access memory (RAM)) that are not shown. During autonomous driving of vehicle 10, compute assembly 210 obtains an environment around the vehicle and a pose, a behavior, and a position of vehicle 10 from various sensors which will be described later as well as a state of vehicle 10 from VP 120 which will be described later through vehicle control interface 110 and sets a next operation (acceleration, deceleration, or turning) of vehicle 10. Compute assembly 210 outputs various instructions for realizing a set next operation of vehicle 10 to vehicle control interface 110.

HMI 230 presents information to a user and accepts an operation during autonomous driving, during driving requiring an operation by a user, or at the time of transition between autonomous driving and driving requiring an operation by the user. HMI 230 is implemented, for example, by a touch panel display, a display apparatus, and an operation apparatus.

Sensors for perception 260 include sensors that perceive an environment around the vehicle, and are implemented, for example, by at least any of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting an image of the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 include sensors that detect a pose, a behavior, or a position of vehicle 10, and are implemented, for example, by an inertial measurement unit (IMU) or a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors during travel of vehicle 10. Sensor cleaning 290 removes soiling on a lens of the camera or a portion from which laser beams or radio waves are emitted, for example, with a cleaning solution or a wiper.

Vehicle control interface 110 includes vehicle control interface boxes (each of which is denoted as a "VCIB" below) 111A and 111B. VCIBs 111A and 111B each include a CPU and a memory (including, for example, a ROM and a RAM) neither of which is shown. Though VCIB 111A is equivalent in function to VCIB 111B, it is partially different in a plurality of systems connected thereto that make up VP 120.

Each of VCIBs 111A and 111B is communicatively connected to compute assembly 210 of ADK 200. VCIB 111A and VCIB 111B are communicatively connected to each other.

Each of VCIBs 111A and 111B relays various instructions from ADK 200 and provides them as control commands to VP 120. More specifically, each of VCIBs 111A and 111B converts various instructions provided from ADK 200 into control commands to be used for control of each system of VP 120 by using information such as a program (for example, an application programming interface (API)) stored in a memory and provides the control commands to a destination system. Each of VCIBs 111A and 111B relays vehicle information output from VP 120 and provides the vehicle information as a vehicle state to ADK 200.

As VCIBs 111A and 111B equivalent in function relating to an operation of at least one of (for example, braking or steering) systems are provided, control systems between ADK 200 and VP 120 are redundant. Therefore, when some kind of failure occurs in a part of the system, the function (turning or stopping) of VP 120 can be maintained by switching between the control systems as appropriate or disconnecting a control system where failure has occurred.

VP 120 includes brake systems 121A and 121B, steering systems 122A and 122B, an electric parking brake (EPB) system 123A, a parking-lock (P-Lock) system 123B, a propulsion system 124, a pre-crash safety (PCS) system 125, and a body system 126.

VCIB 111A is communicatively connected to brake system 121B, steering system 122A, and P-Lock system 123B of the plurality of systems of VP 120 through a communication bus.

VCIB 111B is communicatively connected to brake system 121A, steering system 122B, EPB system 123A, P-Lock system 123B, propulsion system 124, and body system 126 of the plurality of systems of VP 120 through a communication bus.

Brake systems 121A and 121B can control a plurality of braking apparatuses provided in wheels of vehicle 10. Brake system 121A may be equivalent in function to brake system 121B, or any one of them may be able to independently control braking force of each wheel during travel of the vehicle and the other thereof may be able to control braking force such that equal braking force is generated in the wheels during travel of the vehicle. The braking apparatus includes, for example, a disc brake system that is operated with a hydraulic pressure regulated by an actuator.

A wheel speed sensor 127 is connected to brake system 121B. Wheel speed sensor 127 is provided, for example, in each wheel of vehicle 10 and detects a rotation speed of each wheel. Wheel speed sensor 127 outputs the detected rotation speed of each wheel to brake system 121B. Brake system 121B outputs the rotation speed of each wheel to VCIB 111A as one of pieces of information included in vehicle information.

Each of brake systems 121A and 121B generates a braking instruction to a braking apparatus in accordance with a prescribed control command provided from ADK 200 through vehicle control interface 110. For example, brake systems 121A and 121B control the braking apparatus based on a braking instruction generated in any one of the brake systems, and when a failure occurs in one of the brake systems, the braking apparatus is controlled based on a braking instruction generated in the other brake system.

Steering systems 122A and 122B each include a not-shown steering ECU that contains a CPU and a memory (including, for example, a ROM and a RAM) and can control a steering angle of a steering wheel of vehicle 10 with a steering apparatus by means of the steering ECU. Steering system 122A is similar in function to steering system 122B. The steering apparatus includes, for example, rack-and-pinion electric power steering (EPS) that allows adjustment of a steering angle by an actuator.

A pinion angle sensor 128A is connected to steering system 122A. A pinion angle sensor 128B provided separately from pinion angle sensor 128A is connected to steering system 122B. Each of pinion angle sensors 128A and 128B detects an angle of rotation (a pinion angle) of a pinion gear coupled to a rotation shaft of the actuator. Pinion angle sensors 128A and 128B output detected pinion angles to steering systems 122A and 122B, respectively.

Each of steering systems 122A and 122B generates a steering instruction to the steering apparatus in accordance with a prescribed control command provided from ADK 200 through vehicle control interface 110. For example, steering systems 122A and 122B control the steering apparatus based on the steering instruction generated in any one of the steering systems, and when a failure occurs in any one of the steering systems, the steering apparatus is controlled based on a steering instruction generated in the other steering system.

EPB system 123A can control the EPB provided in at least any of wheels of vehicle 10. The EPB is provided separately from the braking apparatus, and fixes (stops) a wheel by an operation of an actuator. The EPB, for example, activates a drum brake for a parking brake provided in at least one of wheels of vehicle 10 by means of an actuator to fix (stop) the wheel, or activates a braking apparatus to fix (stop) a wheel with an actuator capable of regulating a hydraulic pressure to be supplied to the braking apparatus separately from brake systems 121A and 121B.

EPB system 123A controls the EPB in accordance with a prescribed control command provided from ADK 200 through vehicle control interface 110.

P-Lock system 123B can control a P-Lock apparatus provided in a transmission of vehicle 10. The P-Lock apparatus fixes (stops) rotation of an output shaft of the transmission by fitting a protrusion provided at a tip end of a parking lock pawl, a position of which is adjusted by an actuator, into a tooth of a gear (locking gear) provided as being coupled to a rotational element in the transmission.

P-Lock system 123B controls the P-Lock apparatus in accordance with a prescribed control command provided from ADK 200 through vehicle control interface 110.

Propulsion system 124 can switch a shift range with the use of a shift apparatus and can control driving force of vehicle 10 in a direction of travel that is generated from a drive source. The shift apparatus can select any of a plurality of shift ranges. The drive source includes, for example, a motor generator and an engine.

Propulsion system 124 controls the shift apparatus and the drive source in accordance with a prescribed control command provided from ADK 200 through vehicle control interface 110.

PCS system 125 controls vehicle 10 to avoid collision or to mitigate damage by using a camera/radar 129. PCS system 125 is communicatively connected to brake system 121B. PCS system 125 detects an obstacle (an obstacle or a human) in front by using, for example, camera/radar 129, and when it determines that there is possibility of collision based on a distance to the obstacle, it outputs a braking instruction to brake system 121B so as to increase braking force.

Body system 126 can control, for example, components such as a direction indicator, a horn, or a wiper, depending on a state or an environment of travel of vehicle 10. Body system 126 controls the above-described components in accordance with a prescribed control command provided from ADK 200 through vehicle control interface 110.

An operation apparatus that can manually be operated by a user for the braking apparatus, the steering apparatus, the EPB, P-Lock, the shift apparatus, and the drive source described above may separately be provided.

When autonomous driving is carried out in vehicle 10 configured as above, ADK 200 transmits a command relating to autonomous driving control to VCIBs 111A and 111B by executing the API. Initially, ADK 200 obtains information on vehicle main body 100. For example, compute assembly 210 of ADK 200 obtains information on an environment and information on poses of vehicle main body 100 from sensors for perception 260 and sensors for pose 270.

Compute assembly 210 creates a driving plan based on the obtained information on vehicle main body 100. For example, compute assembly 210 calculates a behavior of vehicle main body 100 (for example, poses of vehicle main body 100) and creates a driving plan suitable for a state and an external environment of vehicle main body 100. The driving plan refers to data that shows a behavior of vehicle main body 100 during a prescribed period.

Compute assembly 210 extracts a physical control quantity (an acceleration or a tire turning angle) from the created driving plan. Compute assembly 210 splits the extracted physical quantity for each API cycle. Compute assembly 210 executes the API based on the split physical quantity. As the API is executed as such, an API command for realizing the physical quantity in accordance with the driving plan is transmitted from ADK 200 to vehicle control interface 110. Vehicle control interface 110 transmits a control command corresponding to the received API command to VP 120. VP 120 carries out autonomous driving control of vehicle main body 100 in accordance with the control command.

In the configuration as described above, ADK 200 may incorporate in advance a reference for a limit value of a steering rate on a side of vehicle main body 100. ADK 200 can thus steer vehicle main body 100 at the limit value of the steering rate adapted to vehicle main body 100.

In vehicle 10 in this embodiment, ADK 200 is attachable to and removable from vehicle main body 100 and replaceable with ADK 200 of another specification. With the configuration of the ADK as such, the limit value of the steering rate cannot be controlled to an appropriate value unless the appropriate limit value of the steering rate suitable for vehicle main body 100 is incorporated in advance in ADK 200.

Then, steering systems 122A and 122B specify the limit value of the steering rate in accordance with a prescribed reference and transmit the specified limit value to ADK 200 through VCIBs 111A and 111B. ADK 200 calculates a target steering angle to satisfy the limit value received from steering systems 122A and 122B and transmits an instruction for the calculated steering angle to steering systems 122A and 122B through VCIBs 111A and 111B.

The limit value of the steering rate for calculating the target steering angle is thus conveyed from a side of VP 120 to ADK 200. Consequently, even though attachable and removable ADK 200 that issues an instruction for autonomous driving controls vehicle main body 100, the limit value of the steering rate can be set to an appropriate value suitable for vehicle main body 100.

Figure 3:
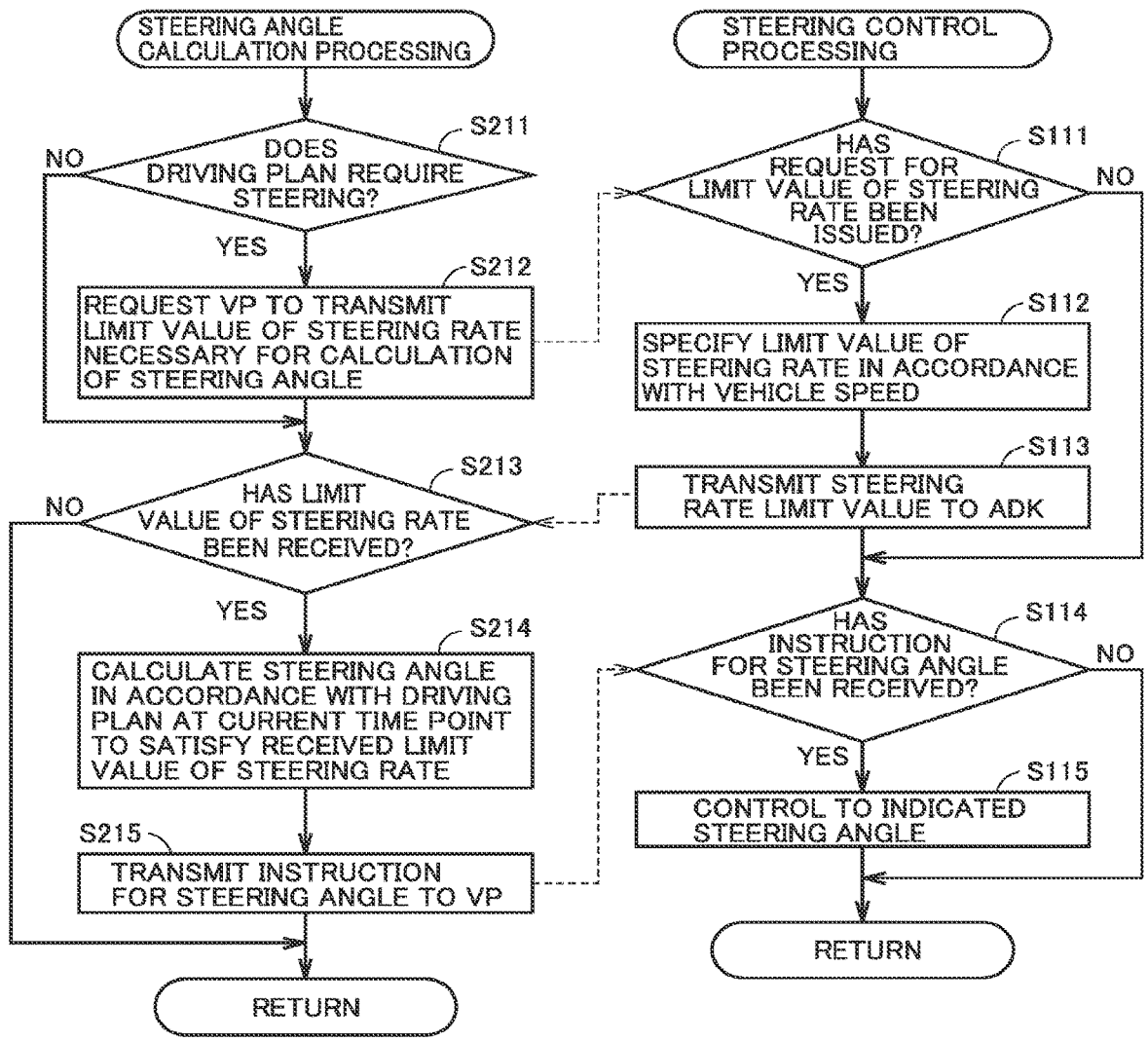
FIG. 3 is a flowchart showing a flow of processing relating to control of a steering angle in this embodiment.

FIG. 3 is a flowchart showing a flow of processing relating to control of a steering angle in this embodiment. Referring to FIG. 3, steering angle calculation processing shown in the flowchart on the left in FIG. 3 is performed by the CPU of compute assembly 210 of ADK 200 as being invoked from higher-order processing such as the API including this steering angle calculation processing and steering control processing shown in the flowchart on the right in FIG. 3 is performed by the steering ECU in each of steering systems 122A and 122B as being invoked from higher-order processing including this steering control processing.

In steering angle calculation processing, the CPU of compute assembly 210 of ADK 200 determines whether or not the driving plan created in higher-order processing requires steering (step S211). When the CPU of compute assembly 210 determines that the driving plan requires steering (YES in step S211), the CPU requests steering systems 122A and 122B of VP 120 to transmit a limit value (Current_Road_Wheel_Angle_Rate_Limit) (which is called a "limit value of the steering rate" below) of variation in tire turning angle necessary for calculation of the steering angle through VCIBs 111A and 111B (step S212).

In steering control processing, the steering ECU of each of steering systems 122A and 122B determines whether or not ADK 200 has issued a request for transmission of the limit value of the steering rate (step S111). When the steering ECU determines that the request has been issued (YES in step S111), the steering ECU of each of steering systems 122A and 122B specifies the limit value of the steering rate in accordance with the vehicle speed (step S112). Specifically, the limit value of the steering rate is specified in accordance with a reference shown in FIG. 4.

Figure 4:
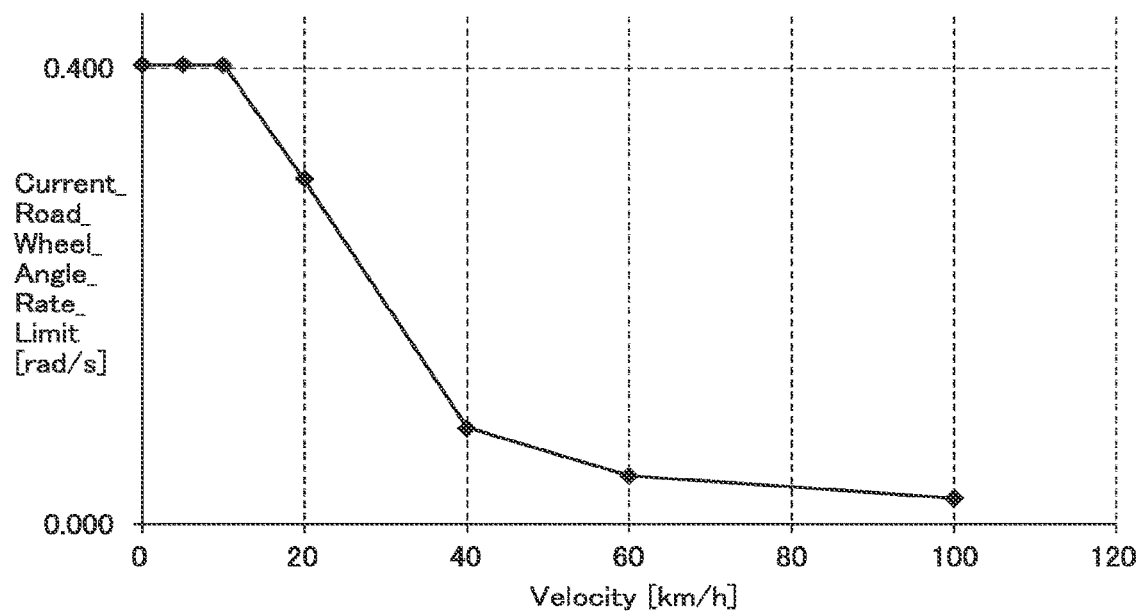
FIG. 4 is a diagram showing a map of relation between a vehicle speed and a limit value of a steering rate in this embodiment.

FIG. 4 is a diagram showing a map of relation between a vehicle speed and a limit value of a steering rate in this embodiment. Referring to FIG. 4, when the vehicle speed is equal to or lower than 10 km/h, the limit value of the steering rate is fixed at 0.400 rad/s.

When the vehicle speed is higher than 10 km/h, relation between the vehicle speed and the limit value of the steering rate satisfies relation predetermined for vehicle 10 as shown in FIG. 4. Relation between the vehicle speed and the limit value of the steering rate is determined in advance to satisfy a condition for safe travel and other conditions, depending on a vehicle model, a vehicle weight, and a tire size. Specifically, relation between the vehicle speed and the limit value of the steering rate is determined in advance, for example, such that a lateral jerk of vehicle main body 100 is lower than a prescribed jerk (for example, 2.94 m/s$^3$). The limit value of the steering rate can thus be specified from the vehicle speed.

Referring back to FIG. 3, the steering ECU of each of steering systems 122A and 122B transmits the specified limit value of the steering rate to ADK 200 (step S113).

When the CPU of compute assembly 210 determines that the driving plan does not require steering in steering angle calculation processing (NO in step S211) and after step S212, the CPU calculates the steering angle in accordance with the driving plan at the current time point to satisfy the received limit value of the steering rate (step S214).

Then, the CPU of compute assembly 210 transmits an instruction for the calculated steering angle to steering systems 122A and 122B of VP 120 (step S215). When the CPU of compute assembly 210 determines that it has not received the limit value of the steering rate (NO in step S213) and after step S215, the CPU has processing to be performed return to the higher-order processing from which this processing has been invoked.

In steering control processing, the steering ECU of each of steering systems 122A and 122B determines whether or not it has received an instruction for the steering angle from ADK 200 (step S114). When the steering ECU of each of steering systems 122A and 122B determines that it has received the instruction (YES in step S114), it controls the steering angle to the indicated steering angle (step S115). When the steering ECU of each of steering systems 122A and 122B determines that it has not received the instruction for the steering angle (NO in step S114) and after step S115, the steering ECU of each of steering systems 122A and 122B has processing to be performed return to the higher-order processing from which this processing has been invoked.

[Modification]

(1) In the embodiment described previously, as shown in FIGS. 1 and 2, ADK 200 can communicate with the plurality of functional units (for example, steering systems 122A and 122B, brake systems 121A and 121B, EPB system 123A, P-Lock system 123B, propulsion system 124, and body system 126) of VP 120 through any of VCIBs 111A and 111B.

Without being limited as such, ADK 200 may directly communicate with the plurality of functional units of VP 120. VCIBs 111A and 111B may issue a control instruction to any of the plurality of functional units in accordance with an instruction from ADK 200.

(2) In the embodiment described previously, each of the plurality of functional units of VP 120 includes an ECU. For example, each of steering systems 122A and 122B includes the steering ECU. As shown in FIG. 3, VCIBs 111A and 111B and the ECUs of the functional units (for example, the steering ECUs of steering systems 122A and 122B) exhibit the functions on the side of vehicle main body 100 in coordination.

Allocation of functions of VCIBs 111A and 111B and the ECUs of the functional units, however, is not limited as shown in FIG. 3. Though VCIBs 111A and 111B are responsible for relay of communication between ADK 200 and the ECUs of the functional units in FIG. 3, VCIBs 111A and 111B may further be responsible for a part of processing by the ECUs of the functional units.

(3) In the embodiment described previously, as shown in FIG. 3, obtainment of the limit value (Current_

Road_Wheel_Angle_Rate_Limit) of the steering rate from steering systems 122A and 122B for calculation of the steering angle by ADK 200 is described.

Values obtained from the plurality of functional units of VP 120 such as steering systems 122A and 122B for calculation of the steering angle in ADK 200, however, are not limited to the limit value of the steering rate, and other values (for example, a steering angle (Steering_Wheel_Angle_Actual) of steering and a steering angular velocity (Steering_Wheel_Angle_Rate_Actual) of steering) are also obtained.

SUMMARY (1) As shown in FIGS. 1 and 2, vehicle 10 is capable of autonomous driving and includes ADK 200 attachable to and removable from vehicle main body 100, ADK 200 issuing an instruction for autonomous driving, VP 120 including a plurality of functional units that perform a plurality of prescribed functions of vehicle main body 100, and VCIBs 111A and 111B that communicate with ADK 200 and issue a control instruction to the functional units in accordance with an instruction from ADK 200. As shown in FIG. 2, one of the plurality of functional units is steering systems 122A and 122B that steer vehicle main body 100.

As shown in FIGS. 3 and 4, steering systems 122A and 122B each specify a limit value of a steering rate in accordance with a prescribed reference (step S112) and transmit the specified limit value to ADK 200 through VCIBs 111A and 111B (step S113). As shown in FIG. 3, ADK 200 calculates a target steering angle to satisfy the limit value received from steering systems 122A and 122B (step S214) and transmits an instruction for the calculated steering angle to steering systems 122A and 122B through VCIBs 111A and 111B (step S215).

The limit value of the steering rate for calculating the target steering angle is thus conveyed from the side of VP 120 to ADK 200. Consequently, when attachable and removable ADK 200 that issues an instruction for autonomous driving controls vehicle main body 100, the limit value of the steering rate can be set to an appropriate value suitable for vehicle main body 100 without storing the limit value of the steering rate in advance in ADK 200.

(2) As shown in FIG. 4, the steering system switches the prescribed reference in accordance with a vehicle speed of vehicle main body 100. The appropriate limit value of the steering rate suitable for vehicle main body 100 can thus be set.

(3) As shown in FIG. 4, the prescribed reference is such a reference that the limit value of the steering rate is defined as a prescribed angular velocity when a vehicle speed of vehicle main body 100 is lower than a prescribed speed. The appropriate limit value of the steering rate in conformity with the vehicle speed of vehicle main body 100 can thus be set.

(4) As shown in FIG. 4, a value of the prescribed angular velocity is 0.4 rad/s. The appropriate limit value of the steering rate in conformity with the vehicle speed of vehicle main body 100 can thus be set.

(5) As shown in FIG. 4, the prescribed reference is such a reference that, when the vehicle speed exceeds a prescribed speed, the limit value of the steering rate satisfies predetermined relation between the vehicle speed and the limit value of the steering rate. The appropriate limit value of the steering rate in conformity with the vehicle speed of vehicle main body 100 can thus be set.

(6) As shown in FIG. 4, a value of the prescribed speed is 10 km/h. The appropriate limit value of the steering rate in conformity with the vehicle speed of vehicle main body 100 can thus be set.

(7) As shown in FIG. 4, the prescribed reference is a reference determined in advance such that a lateral jerk of vehicle main body 100 is lower than a prescribed jerk. The appropriate limit value of the steering rate in conformity with the vehicle speed of vehicle main body 100 can thus be set.

(8) As shown in FIG. 4, a value of the prescribed jerk is 2.94 m/s$^3$. The appropriate limit value of the steering rate in conformity with the vehicle speed of vehicle main body 100 can thus be set.

(9) As shown in FIGS. 1 and 2, ADK 200 issues an instruction for autonomous driving of vehicle main body 100 and is attachable to and removable from vehicle main body 100. As shown in FIG. 2, vehicle main body 100 includes a plurality of functional units that perform a plurality of prescribed functions of vehicle main body 100 and the functional units are controlled in accordance with an instruction from ADK 200. As shown in FIG. 2, one of the plurality of functional units is steering systems 122A and 122B that steer vehicle main body 100. As shown in FIGS. 3 and 4, ADK 200 calculates a target steering angle to satisfy a limit value of a steering rate specified by steering systems 122A and 122B in accordance with a prescribed reference (step S214) and transmits an instruction for the calculated steering angle to steering systems 122A and 122B through VCIBs 111A and 111B (step S215).

Thus, when attachable and removable ADK 200 that issues an instruction for autonomous driving controls vehicle main body 100, the limit value of the steering rate can be set to an appropriate value suitable for vehicle main body 100 without storing the limit value of the steering rate in advance in ADK 200.

(10) As shown in FIGS. 1 and 2, vehicle 10 is capable of autonomous driving and includes VP 120 and VCIBs 111A and 111B, VP 120 including a plurality of functional units that perform a plurality of prescribed functions of vehicle main body 100, VCIBs 111A and 111B communicating with ADK 200 that issues an instruction for autonomous driving and is attachable to and removable from vehicle main body 100, VCIBs 111A and 111B issuing a control instruction to the functional units in accordance with an instruction from ADK 200. As shown in FIG. 2, one of the plurality of functional units is steering systems 122A and 122B that steer vehicle main body 100. As shown in FIGS. 3 and 4, steering systems 122A and 122B each specify a limit value of a steering rate in accordance with a prescribed reference (step S112), transmit the specified limit value to ADK 200 through VCIBs 111A and 111B, (S113), and control the steering angle in accordance with an instruction for a target steering angle calculated by ADK 200 to satisfy the limit value received from steering systems 122A and 122B (S115).

Thus, when attachable and removable ADK 200 that issues an instruction for autonomous driving controls vehicle main body 100, the limit value of the steering rate can be set to an appropriate value suitable for vehicle main body 100 without storing the limit value of the steering rate in advance in ADK 200.

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| 2019 May 4 | 0.1 | Creating a new material | MaaS Business Div. |

Index
1. Outline 4
1.1. Purpose of this Specification 4
1.2. Target Vehicle 4
1.3. Definition of Term 4
1.4. Precaution for Handling 4
2. Structure 5
2.1. Overall Structure of MaaS 5
2.2. System structure of MaaS vehicle 6
3. Application Interfaces 7
3.1. Responsibility sharing of when using APIs 7
3.2. Typical usage of APIs 7
3.3. APIs for vehicle motion control 9
　3.3.1. Functions 9
　3.3.2. Inputs 16
　3.3.3. Outputs 23
3.4. APIs for BODY control 45
　3.4.1. Functions 45
　3.4.2. Inputs 45
　3.4.3. Outputs 56
3.5. APIs for Power control 68
　3.5.1. Functions 68
　3.5.2. Inputs 68
　3.5.3. Outputs 69
3.6. APIs for Safety 70
　3.6.1. Functions 70
　3.6.2. Inputs 70
　3.6.3. Outputs 70
3.7. APIs for Security 74
　3.7.1. Functions 74
　3.7.2. Inputs 74
　3.7.3. Outputs 76
3.8. APIs for MaaS Service 80
　3.8.1. Functions 80
　3.8.2. Inputs 80
　3.8.3. Outputs 80
1. Outline 1.1. Purpose of this Specification This document is an API specification of Toyota Vehicle Platform and contains the outline, the usage and the caveats of the application interface.

1.2. Target Vehicle e-Palette, MaaS vehicle based on the POV (Privately Owned Vehicle) manufactured by Toyota 1.3. Definition of Term

TABLE 2

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

Figure 5:
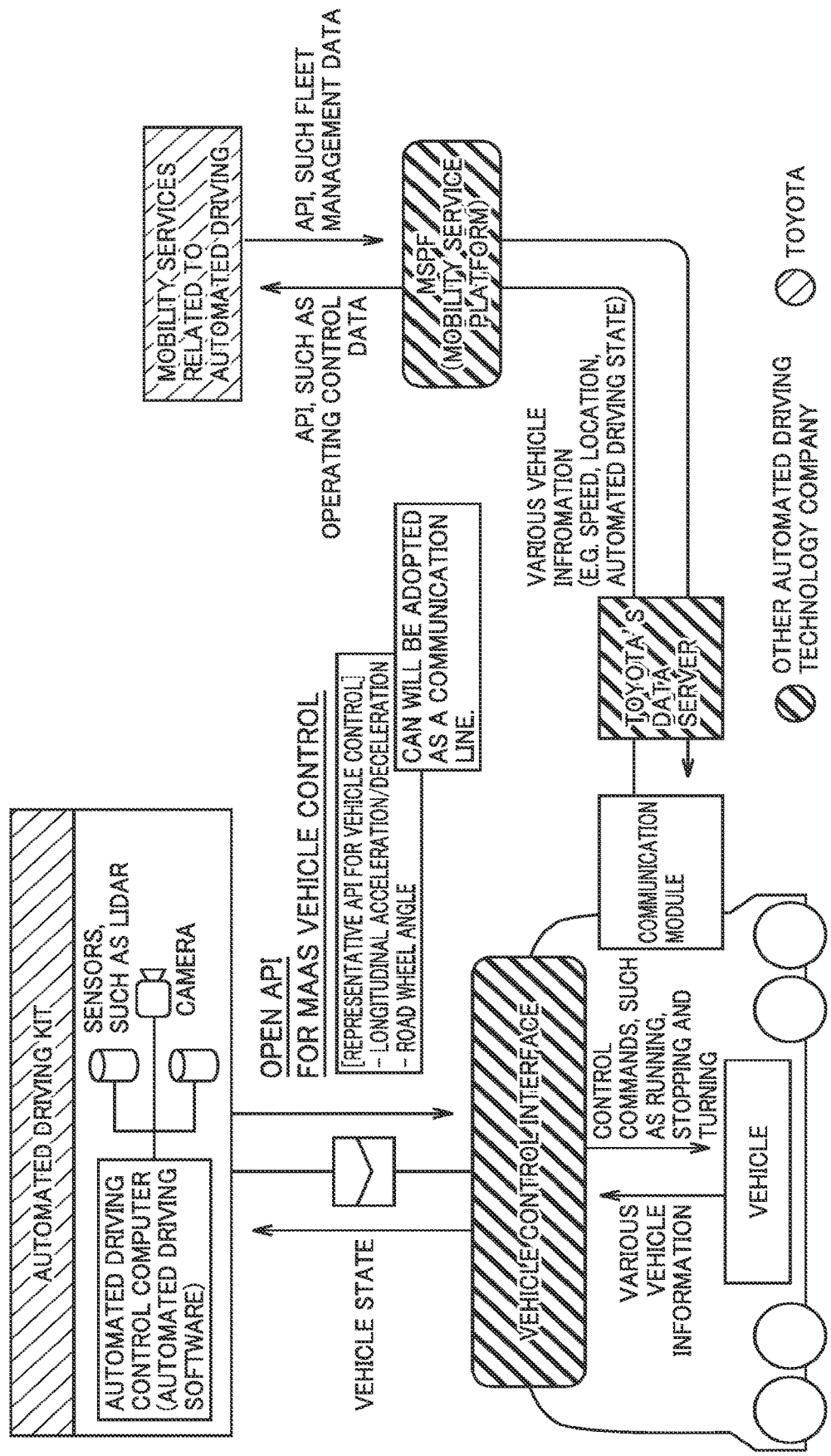
FIG. 5 is a diagram of an overall configuration of MaaS.

This is an early draft of the document.
All the contents are subject to change. Such changes are notified to the users. Please note that some parts are still T.B.D. will be updated in the future.
2. Structure 2.1. Overall Structure of MaaS The overall structure of MaaS with the target vehicle is shown (FIG. 5).
Vehicle control technology is being used as an interface for technology providers.
Technology providers can receive open API such as vehicle state and vehicle control, necessary for development of automated driving systems.

2.2. System Structure of MaaS Vehicle

Figure 6:
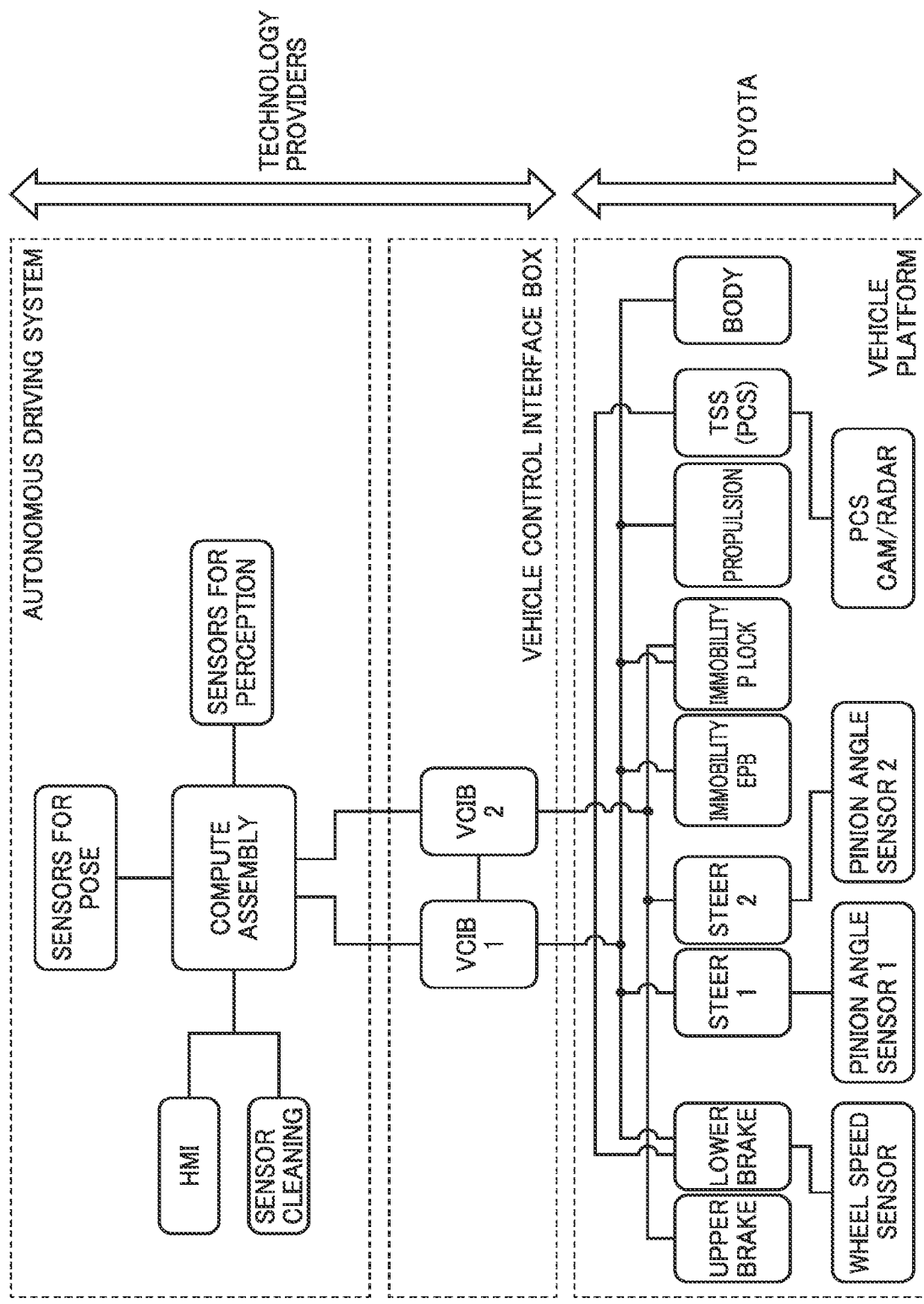
FIG. 6 is a diagram of a system configuration of a MaaS vehicle.

The system architecture as a premise is shown (FIG. 6).
The target vehicle will adopt the physical architecture of using CAN for the bus between ADS and VCIB. In order to realize each API in this document, the CAN frames and the bit assignments are shown in the form of "bit assignment table" as a separate document.
3. Application Interfaces 3.1. Responsibility Sharing of when Using APIs Basic responsibility sharing between ADS and vehicle VP is as follows when using APIs.
[ADS]
The ADS should create the driving plan, and should indicate vehicle control values to the VP.
[VP]
The Toyota VP should control each system of the VP based on indications from an ADS.

3.2. Typical Usage of APIs

In this section, typical usage of APIs is described.
CAN will be adopted as a communication line between ADS and VP. Therefore, basically, APIs should be executed every defined cycle time of each API by ADS.
A typical workflow of ADS of when executing APIs is as follows (FIG. 7).

3.3. APIs for Vehicle Motion Control

In this section, the APIs for vehicle motion control which is controllable in the MaaS vehicle is described.

3.3.1. Functions

3.3.1.1. Standstill, Start Sequence

The transition to the standstill (immobility) mode and the vehicle start sequence are described. This function presupposes the vehicle is in Autonomy_State=Autonomous Mode. The request is rejected in other modes.

The below diagram shows an example.

Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

If the vehicle needs to start, the brake hold control is cancelled by setting Standstill Command to "Released". At the same time, acceleration/deceleration is controlled based on Acceleration Command (FIG. 8).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill". Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

Figure 9:
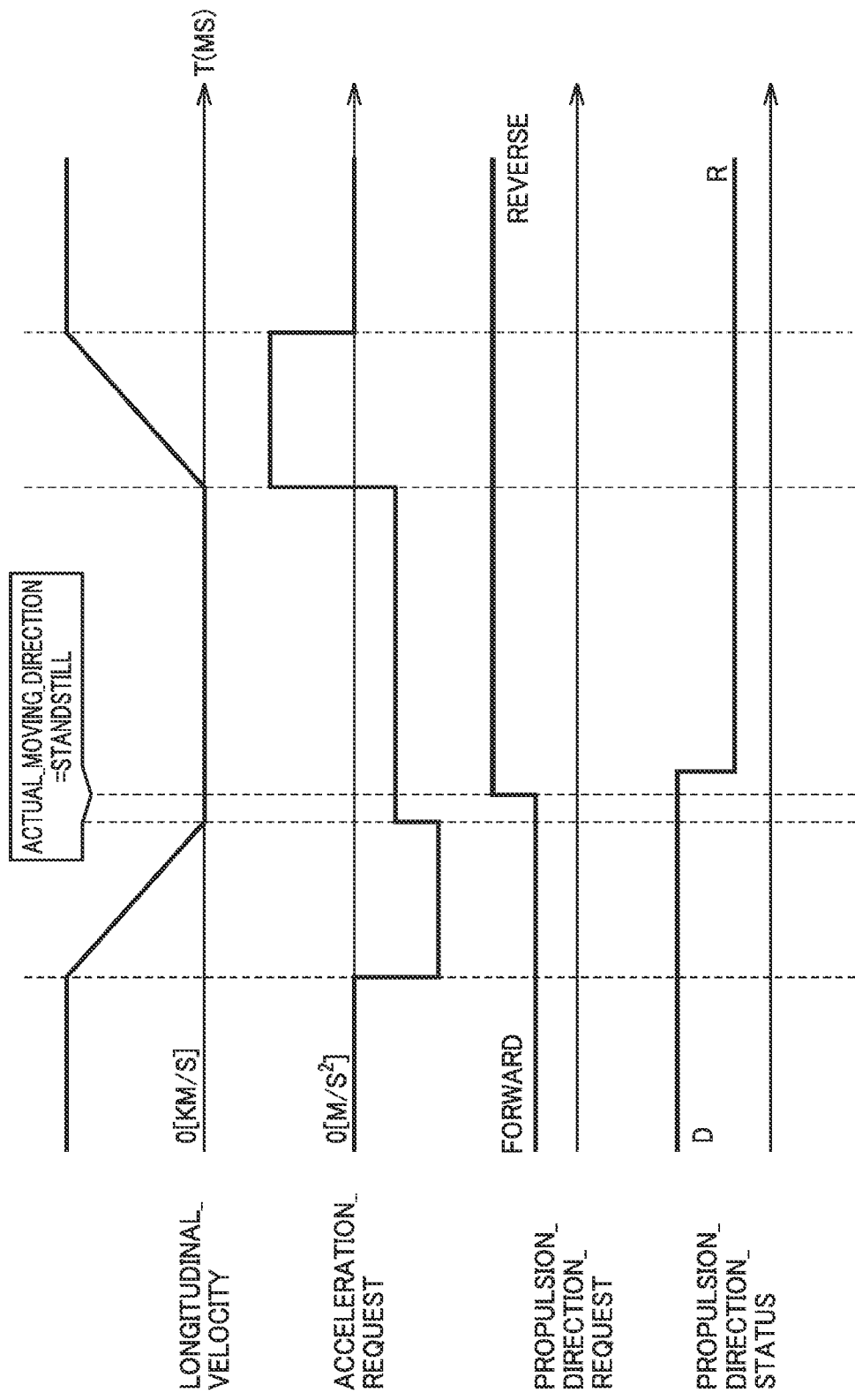
FIG. 9 is a diagram showing an exemplary timing chart of the API relating to shift change of the MaaS vehicle.

After the shift change, acceleration/deceleration is controlled based on Acceleration Command value (FIG. 9).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

Figure 10:
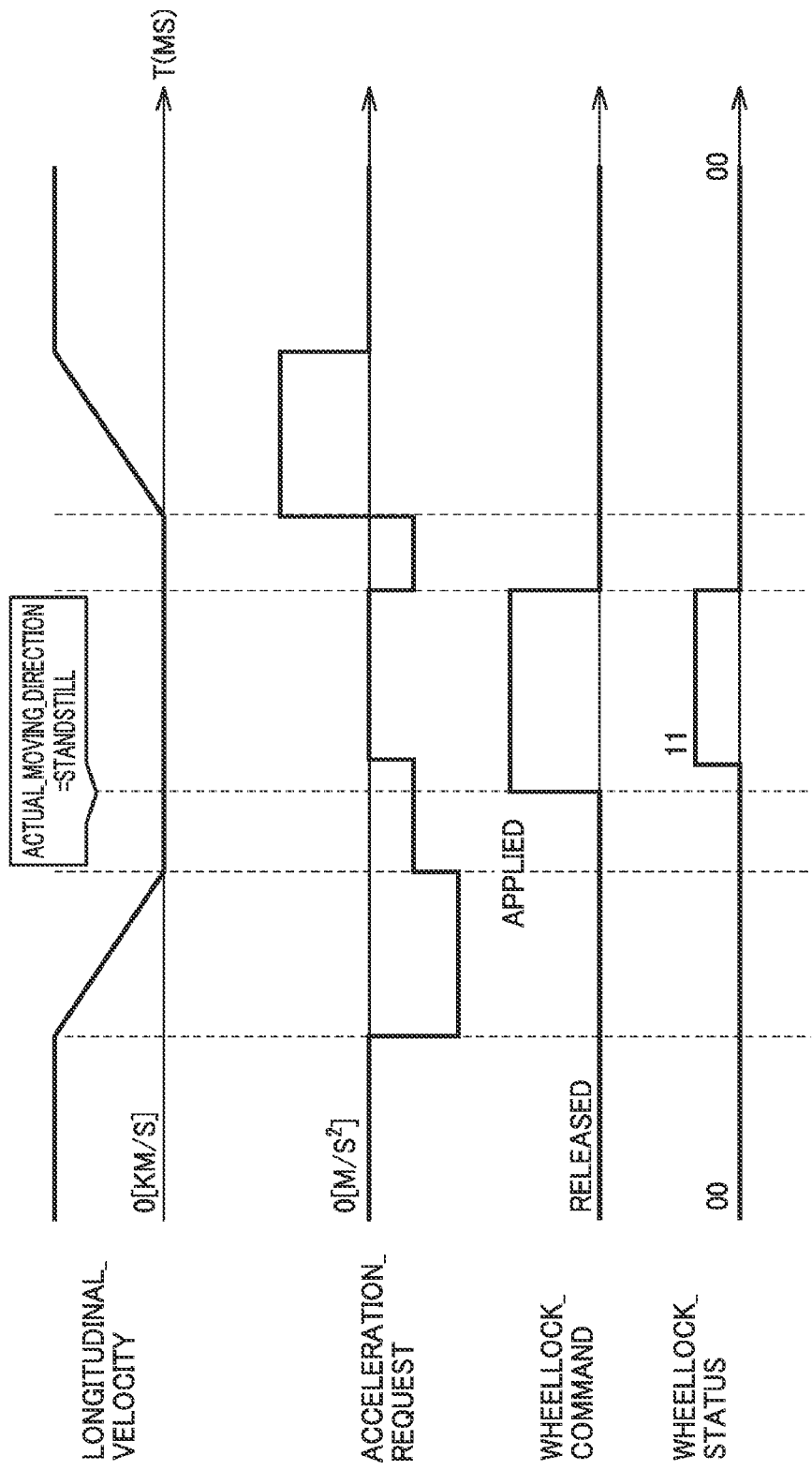
FIG. 10 is a diagram showing an exemplary timing chart of the API relating to wheel lock of the MaaS vehicle.

After this, the vehicle is accelerated/decelerated based on Acceleration Command value (FIG. 10).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
|---|---|---|
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
|---|---|---|
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration (−0.4 m/s$^2$) simultaneously. (Only while brake is applied.)

The request may not be accepted in following cases.

Direction_Control_Degradation_Modes="Failure detected"

3.3.2.2. Immobilization Command

Request to engage/release WheelLock

Values

TABLE 5

| value | Description | Remarks |
|---|---|---|
| 0 | No Request | |
| 1 | Applied | EPB is turned on and TM shifts to P range |
| 2 | Released | EPB is turned off and TM shifts to the value of Propulsion Direction Command |

Remarks

Available only when Autonomy_State="Autonomous Mode"

Changeable only when the vehicle is stationary (Actual_Moving_Direction="standstill")

The request is rejected when vehicle is running.

When Apply/Release mode change is requested, Acceleration Command is set to deceleration (−0.4 m/s$^2$). (Only while brake is applied.)

3.3.2.3. Standstill Command

Request the vehicle to be stationary

Values

TABLE 6

| value | Description | Remarks |
|---|---|---|
| 0 | No Request | |
| 1 | Applied | Standstill is requested |
| 2 | Released | |

Remarks

Only available when Autonomy_State="Autonomous Mode"

Confirmed by Standstill Status="Applied"

When the vehicle is stationary (Actual_Moving_Direction="standstill"), transition to Stand Still is enabled.

Acceleration Command has to be continued until Standstill Status becomes "Applied" and Acceleration Command's deceleration request (−0.4 m/s$^2$) should be continued.

There are more cases where the request is not accepted. Details are T.B.D.

3.3.2.4. Acceleration Command

Command vehicle acceleration

Values

Estimated_Max_Decel_Capability to Estimated_Max_Accel_Capability [m/s$^2$]

Remarks

Only available when Autonomy_State="Autonomous Mode"

Acceleration (+) and deceleration (−) request based on Propulsion Direction Status direction The upper/lower limit will vary based on Estimated_Max_Decel_Capability and Estimated_Max_Accel_Capability.

When acceleration more than Estimated_Max_Accel_Capability is requested, the request is set to Estimated_Max_Accel_Capability.

When deceleration more than Estimated_Max_Decel_Capability is requested, the request is set to Estimated_Max_Decel_Capability.

Depending on the accel/brake pedal stroke, the requested acceleration may not be met. See 3.4.1.4 for more detail.

When Pre-Collision system is activated simultaneously, minimum acceleration (maximum deceleration) is selected.

3.3.2.5. Tire Turning Angle Command

Command tire turning angle

Values

TABLE 7

| value | Description | Remarks |
|---|---|---|
| — | | [unit: rad] |

Remarks

Left is positive value (+). Right is negative value (−).

Available only when Autonomy_State="Autonomous Mode"

The output of Estimated_Road_Wheel_Angle_Actual when the vehicle is going straight, is set to the reference value (0).

This requests relative value of Estimated_Road_Wheel_Angle_Actual. (See 3.4.1.1 for details)

The requested value is within Current_Road_Wheel_Angle_Rate_Limit.

The requested value may not be fulfilled depending on the steer angle by the driver.

3.3.2.6. Autonomization Command

Request to transition between manual mode and autonomy mode

Values

TABLE 8

| value | Description | Remarks |
|---|---|---|
| 00b | No Request For Autonomy | |
| 01b | Request For Autonomy | |
| 10b | Deactivation Request means transition request to manual mode | |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current shift range

Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".

When the vehicle becomes the following status during VO mode, [Propulsion Direction Status] will turn to "P".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened

3.3.3.2. Propulsion Direction by Driver

Shift lever position by driver operation

Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver

If the driver releases his hand of the shift lever, the lever returns to the central position and the output is set as "No Request".

When the vehicle becomes the following status during NVO mode, [Propulsion Direction by Driver] will turn to "1(P)".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened 3.3.3.3. Immobilization Status

Output EPB and Shift-P status

Values

<Primary>

TABLE 12

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | | |
|---|---|---|---|
| Shift | | Description | Remarks |
| 0 | 0 | Other than Shift P | |
| 1 | 0 | Shift P | |
| 0 | 1 | Reserved | |
| 1 | 1 | Reserved | |

Remarks

Secondary signal does not include EPB lock status.

3.3.3.4. Immobilization Request by Driver

Driver operation of EPB switch

Values

TABLE 14

| value | Description | remarks |
|---|---|---|
| 0 | No Request | |
| 1 | Engaged | |
| 2 | Released | |
| 3 | Invalid value | |

Remarks

"Engaged" is outputted while the EPB switch is being pressed.

"Released" is outputted while the EPB switch is being pulled.

3.3.3.5. Standstill Status

Vehicle stationary status

Values

TABLE 15

| Value | Description | remarks |
|---|---|---|
| 0 | Released | |
| 1 | Applied | |
| 2 | Reserved | |
| 3 | Invalid value | |

Remarks

When Standstill Status=Applied continues for 3 minutes, EPB is activated.

If the vehicle is desired to start, ADS requests Standstill Command="Released".

3.3.3.6. Estimated_Coasting_Rate

Estimated vehicle deceleration when throttle is closed

Values

[unit: m/s$^2$]

Remarks

Estimated acceleration at WOT is calculated.

Slope and road load etc. are taken into estimation.

When the Propulsion Direction Status is "D", the acceleration to the forward direction shows a positive value.

When the Propulsion Direction Status is "R", the acceleration to the reverse direction shows a positive value.

3.3.3.7. Estimated_Max_Accel_Capability

Estimated maximum acceleration

Values

[unit: m/s$^2$]

Remarks

The acceleration at WOT is calculated.

Slope and road load etc. are taken into estimation.

The direction decided by the shift position is considered to be plus.

3.3.3.8. Estimated_Max_Decel_Capability

Estimated maximum deceleration

Values

−9.8 to 0 [unit: m/s$^2$]

Remarks

Affected by Brake_System_Degradation_Modes. Details are T.B.D.

Based on vehicle state or road condition, cannot output in some cases 3.3.3.9. Estimated_Road_Wheel_Angle_Actual Front wheel steer angle Values

TABLE 16

| value | Description | Remarks |
|---|---|---|
| others | [unit: rad] | |
| Minimum Value | Invalid value | The sensor is invalid. |

Remarks

Left is positive value (+). Right is negative value (−).

Before "the wheel angle when the vehicle is going straight" becomes available, this signal is Invalid value.

3.3.3.10. Estimated_Road_Wheel_Angle_Rate_Actual

Front wheel steer angle rate

Values

TABLE 17

| value | Description | Remarks |
|---|---|---|
| others | [unit: rad/s] | |
| Minimum Value | Invalid value | |

Remarks

Left is positive value (+). Right is negative value (−).

3.3.3.11. Steering_Wheel_Angle_Actual

Steering wheel angle

Values

TABLE 18

| Value | Description | Remarks |
|---|---|---|
| others | [unit; rad] | |
| Minimum Value | Invalid value | |

Remarks

Left is positive value (+). Right is negative value (−).

The steering angle converted from the steering assist motor angle

Before "the wheel angle when the vehicle is going straight" becomes available, this signal is Invalid value.

3.3.3.12. Steering_Wheel_Angle_Rate_Actual

Steering wheel angle rate

Values

TABLE 19

| Value | Description | Remarks |
|---|---|---|
| others | [unit: rad/s] | |
| Minimum Value | Invalid value | |

Remarks

Left is positive value (+). Right is negative value (−).

The steering angle rate converted from the steering assist motor angle rate 3.3.3.13. Current_Road_Wheel_Angle_Rate_Limit Road wheel angle rate limit Values When stopped: 0.4 [rad/s]

While running: Show "Remarks"

Remarks

Calculated from the "vehicle speed–steering angle rate" chart like below

A) At a very low speed or stopped situation, use fixed value of 0.4 [rad/s]

Figure 11:
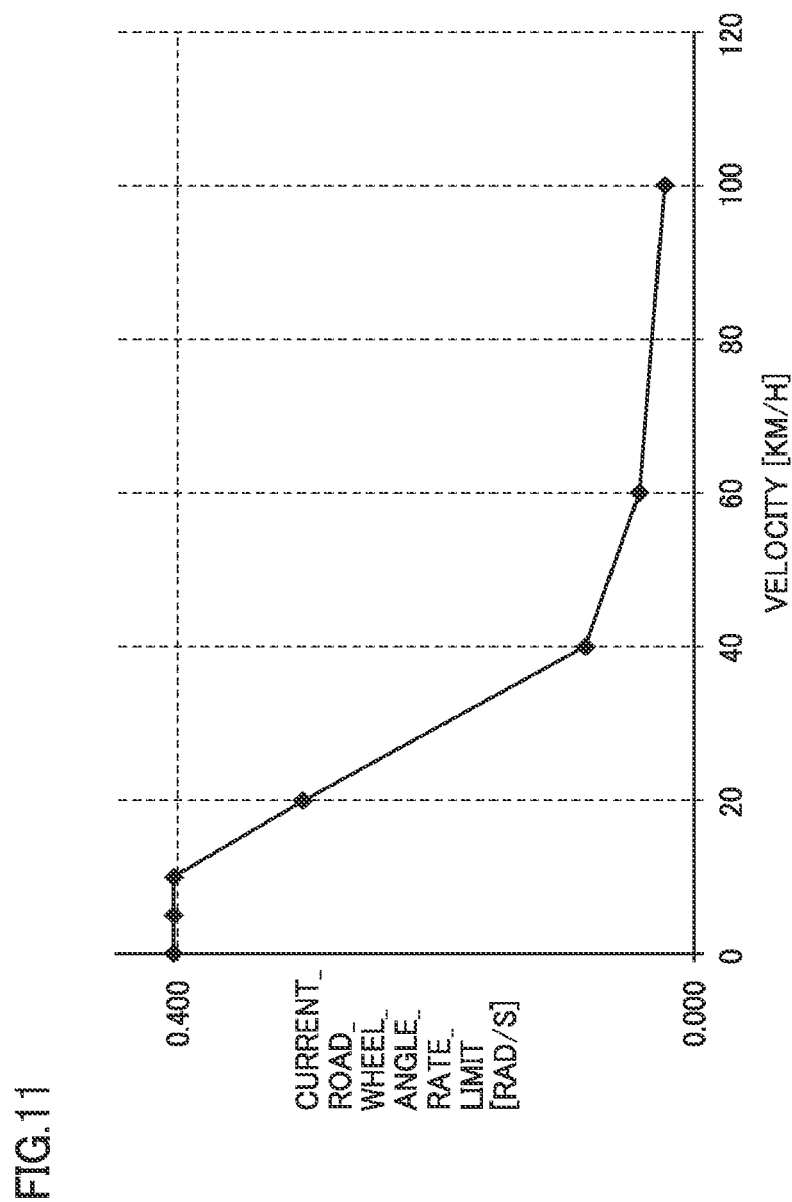
FIG. 11 is a diagram showing a limit value of variation in tire turning angle.

B) At a higher speed, the steering angle rate is calculated from the vehicle speed using 2.94 m/s$^3$ The threshold speed between A and B is 10 [km/h] (FIG. 11).

3.3.3.14. Estimated_Max_Lateral_Acceleration_Capability

Estimated max lateral acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated max lateral acceleration rate

Values 2.94 [unit: m/s$^3$] fixed value

Remarks

Wheel Angle controller is designed within the acceleration range up to 2.94 m/s$^3$.

3.3.3.16. Accelerator_Pedal_Position

Position of the accelerator pedal (How much is the pedal depressed?)

Values 0 to 100 [unit: %]

Remarks

In order not to change the acceleration openness suddenly, this signal is filtered by smoothing process.

In normal condition

The accelerator position signal after zero point calibration is transmitted.

In failure condition

Transmitted failsafe value (0xFF)

3.3.3.17. Accelerator_Pedal_Intervention

This signal shows whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal will not turn to "2".

Figure 12:
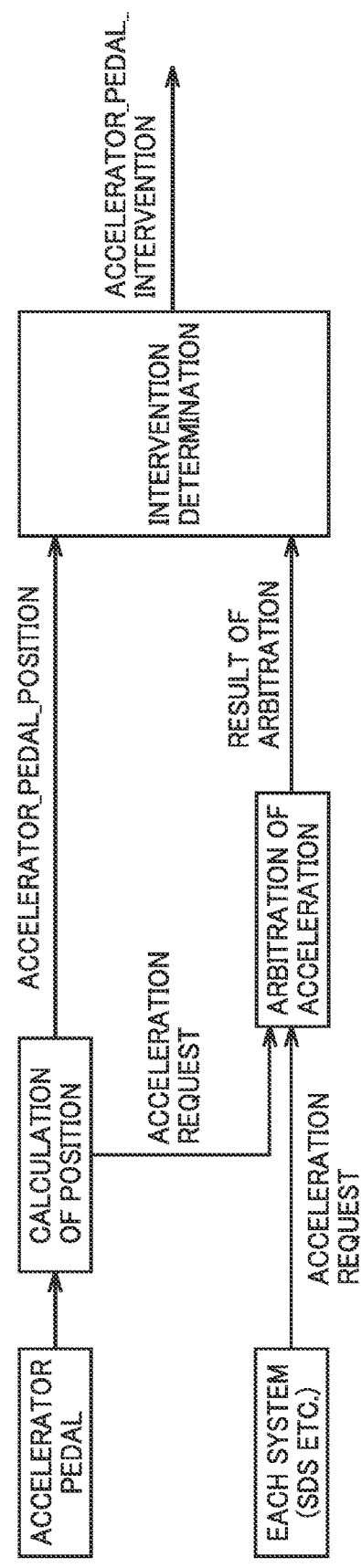
FIG. 12 is a diagram illustrating intervention by an accelerator pedal.

Detail Design (FIG. 12)

3.3.3.18. Brake_Pedal_Position

Position of the brake pedal (How much is the pedal depressed?)

Values 0 to 100 [unit: %]

Remarks

In the brake pedal position sensor failure:

Transmitted failsafe value (0xFF)

Due to assembling error, this value might be beyond 100%.

3.3.3.19. Brake_Pedal_Intervention
This signal shows whether the brake pedal is depressed by a driver (intervention).
Values

TABLE 21

| Value | Description | Remarks |
|---|---|---|
| 0 | Not depressed | |
| 1 | depressed | |
| 2 | Beyond autonomy deceleration | |

Figure 13:
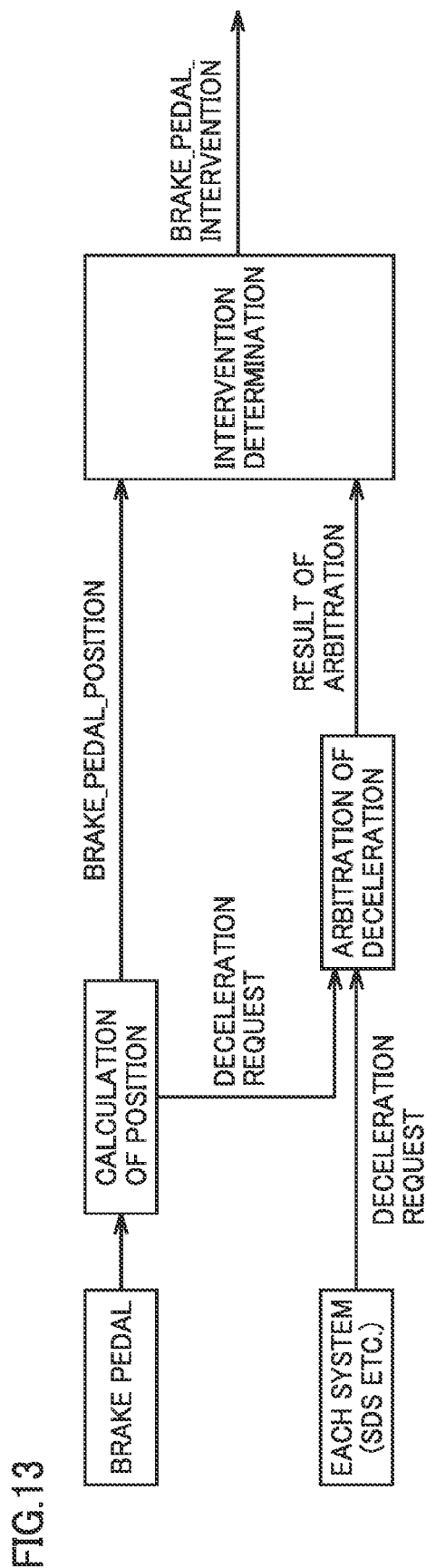
FIG. 13 is a diagram illustrating intervention by a brake pedal.

Remarks
When Brake_Pedal_Position is higher than the defined threshold value (BRK_INTV), this signal [Brake_Pedal_Intervention] will turn to "depressed".
When the requested deceleration from depressed brake pedal is higher than the requested deceleration from system (ADS, PCS etc.), this signal will turn to "Beyond autonomy deceleration".
Detail Design (FIG. 13)

3.3.3.20. Steering_Wheel_Intervention
This signal shows whether the steering wheel is turned by a driver (intervention).
Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks
In "Steering Wheel Intervention=1", considering the human driver's intent, EPS system will drive the steering with the Human driver collaboratively.
In "Steering Wheel Intervention=2", considering the human driver's intent, EPS system will reject the steering requirement from autonomous driving kit. (The steering will be driven the human driver.)

3.3.3.21. Shift_Lever_Intervention
This signal shows whether the shift lever is controlled by a driver (intervention).
Values

TABLE 23

| Value | Description | Remarks |
|---|---|---|
| 0 | OFF | |
| 1 | ON | Controlled (moved to any shift position) |

Remarks
N/A 3.3.3.22. WheelSpeed_FL, WheelSpeed_FR, WheelSpeed_RL, WheelSpeed_RR wheel speed value
Values

TABLE 24

| Value | Description | Remarks |
|---|---|---|
| others | Velocity [unit: m/s] | |
| Maximum Value | Invalid value | The sensor is invalid. |

Remarks
T.B.D.

3.3.3.23. WheelSpeed_FL_Rotation, WheelSpeed_FR_Rotation, WheelSpeed_RL_Rotation, WheelSpeed_RR_Rotation
Rotation direction of each wheel
Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks
After activation of ECU, until the rotation direction is fixed, "Forward" is set to this signal.
When detected continuously 2 (two) pulses with the same direction, the rotation direction will be fixed.

3.3.3.24. Actual_Moving_Direction
Rotation direction of wheel
Values

TABLE 26

| value | Description | remarks |
|---|---|---|
| 0 | Forward | |
| 1 | Reverse | |
| 2 | Standstill | |
| 3 | Undefined | |

Remarks
This signal shows "Standstill" when four wheel speed values are "0" during a constant time.
When other than above, this signal will be determined by the majority rule of four WheelSpeed_Rotations.
When more than two WheelSpeed_Rotations are "Reverse", this signal shows "Reverse".
When more than two WheelSpeed_Rotations are "Forward", this signal shows "Forward".
When "Forward" and "Reverse" are the same counts, this signal shows "Undefined".

3.3.3.25. Longitudinal_Velocity
Estimated longitudinal velocity of vehicle
Values

TABLE 27

| Value | Description | Remarks |
|---|---|---|
| others | Velocity [unit: m/s] | |
| Maximum Value | Invalid value | The sensor is invalid. |

Remarks
This signal is output as the absolute value.

3.3.3.26. Longitudinal_Acceleration
Estimated longitudinal acceleration of vehicle
Values

TABLE 28

| value | Description | Remarks |
|---|---|---|
| others | Acceleration [unit: m/s$^2$] | |
| Minimum Value | Invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral_Acceleration

Sensor value of lateral acceleration of vehicle

Values

TABLE 29

| Value | Description | Remarks |
|---|---|---|
| others | Acceleration [unit: m/s$^2$] | |
| Minimum Value | Invalid value | The sensor is invalid. |

Remarks

The positive value means counterclockwise. The negative value means clockwise.

3.3.3.28. Yawrate

Sensor value of Yaw rate

Values

TABLE 30

| Value | Description | Remarks |
|---|---|---|
| others | Yaw rate [unit: deg/s] | |
| Minimum Value | Invalid value | The sensor is invalid. |

Remarks

The positive value means counterclockwise. The negative value means clockwise.

3.3.3.29. Autonomy_State

State of whether autonomy mode or manual mode

Values

TABLE 31

| value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

3.3.3.30. Autonomy_Ready

Situation of whether the vehicle can transition to autonomy mode or not

Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks

This signal is a part of transition conditions toward the Autonomy mode.

Please see the summary of conditions.

3.3.3.31. Autonomy_Fault

Status of whether the fault regarding a functionality in autonomy mode occurs or not Values

TABLE 33

| value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.

[T.B.D.] Need to consider the condition to release the status of "fault".

3.4. APIs for BODY Control 3.4.1. Functions

T.B.D.

3.4.2. Inputs

TABLE 34

| Signal Name | Description | Redundancy |
|---|---|---|
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |

TABLE 34-continued

| Signal Name | Description | Redundancy |
|---|---|---|
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform

Values

TABLE 35

| value | Description | remarks |
|---|---|---|
| 0 | OFF | Blinker OFF |
| 1 | Right | Right blinker ON |
| 2 | Left | Left blinker ON |
| 3 | reserved | |

Remarks

T.B.D.

Detailed Design

When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to control the headlight mode of the vehicle platform

Values

TABLE 36

| Value | Description | remarks |
|---|---|---|
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.

Driver input overrides this command.

Headlight mode changes when Vehicle platform receives once this command.

3.4.2.3. Hazardlight_Mode_Command

Command to control the hazardlight mode of the vehicle platform

Values

TABLE 37

| value | Description | remarks |
|---|---|---|
| 0 | OFF | command for hazardlight OFF |
| 1 | ON | command for hazardlight ON |

Remarks

Driver input overrides this command.

Hazardlight is active during Vehicle Platform receives ON command.

3.4.2.4. Horn_Pattern_Command

Command to control the pattern of horn ON-time and OFF-time per cycle of the vehicle platform Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.

Detail is under internal discussion.

3.4.2.5. Horn_Number_of_Cycle_Command

Command to control the Number of horn ON/OFF cycle of the vehicle platform

Values

0~7 [-]

Remarks

Detail is under internal discussion.

3.4.2.6. Horn_Continuous_Command

Command to control of horn ON of the vehicle platform

Values

TABLE 39

| value | Description | remarks |
|---|---|---|
| 0 | No request | |
| 1 | ON request | |

Remarks

This command overrides Horn_Pattern_Command, Horn_Number_of_Cycle_Command.

Horn is active during Vehicle Platform receives ON command.

Detail is under internal discussion.

3.4.2.7. Windshieldwiper_Mode_Front_Command

Command to control the front windshield wiper of the vehicle platform

Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.

This command is valid when Windshieldwiper_Front_Driver_Input=OFF or Auto mode ON.

Driver input overrides this command.

Windshieldwiper mode is kept during Vehicle platform is receiving the command.

3.4.2.8. Windshieldwiper_Intermittent_Wiping_Speed_Command

Command to control the Windshield wiper actuation interval at the Intermittent mode Values

TABLE 41

| value | Description | remarks |
|---|---|---|
| 0 | FAST | |
| 1 | SECOND FAST | |
| 2 | THIRD FAST | |
| 3 | SLOW | |

Remarks

This command is valid when Windshieldwiper_Mode_Front_Status=INT.

Driver input overrides this command.

Windshieldwiper intermittent mode changes when Vehicle platform receives once this command.

3.4.2.9. Windshieldwiper_Mode_Rear_Command

Command to control the rear windshield wiper mode of the vehicle platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks

Driver input overrides this command.

Windshieldwiper mode is kept during Vehicle platform is receiving the command.

Wiping speed of intermittent mode is not variable.

3.4.2.10. Hvac_1st_Command

Command to start/stop 1st row air conditioning control

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks

The hvac of S-AM has a synchronization functionality.

Therefore, in order to control 4 (four) hvacs (1st_left/right, 2nd_left/right) individually, VCIB achieves the following procedure after Ready-ON. (This functionality will be implemented from the CV.)

1: Hvac_1st_Command=ON

2: Hvac_2nd_Command=ON

3: Hvac_TargetTemperature_2nd_Left_Command

4: Hvac_TargetTemperature_2nd_Right_Command

5: Hvac_Fan_Level_2nd_Row_Command

6: Hvac_2nd_Row_AirOutlet_Mode_Command

7: Hvac_TargetTemperature_1st_Left_Command

8: Hvac_TargetTemperature_1st_Right_Command

9: Hvac_Fan_Level_1st_Row_Command

10: Hvac_1st_Row_AirOutlet_Mode_Command

The interval between each command needs 200 ms or more.

Other commands are able to be executed after #1.

3.4.2.11. Hvac_2nd_Command

Command to start/stop 2nd row air conditioning control

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks
N/A 3.4.2.12. Hvac_TargetTemperature_1st_Left_Command
Command to set the target temperature around front left area
Values

TABLE 45

| value | Description | Remarks |
|---|---|---|
| 0 | No request | |
| 60 to 85 [unit: ° F.] (by 1.0° F.) | Temperature direction | |

Remarks
N/A 3.4.2.13. Hvac_TargetTemperature_1st_Right_Command
Command to set the target temperature around front right area
Values

TABLE 46

| value | Description | Remarks |
|---|---|---|
| 0 | No request | |
| 60 to 85 [unit: ° F.] (by 1.0° F.) | Temperature direction | |

Remarks
N/A 3.4.2.14. Hvac_TargetTemperature_2nd_Left_Command
Command to set the target temperature around rear left area
Values

TABLE 47

| value | Description | Remarks |
|---|---|---|
| 0 | No request | |
| 60 to 85 [unit: ° F.] (by 1.0° F.) | Temperature direction | |

Remarks
N/A 3.4.2.15. Hvac_TargetTemperature_2nd_Right_Command
Command to set the target temperature around rear right area
Values

TABLE 48

| value | Description | Remarks |
|---|---|---|
| 0 | No request | |
| 60 to 85 [unit: ° F.] (by 1.0° F.) | Temperature direction | |

Remarks
N/A 3.4.2.16. Hvac_Fan_Level_1st_Row_Command
Command to set the fan level on the front AC
Values

TABLE 49

| value | Description | Remarks |
|---|---|---|
| 0 | No request | |
| 1 to 7 (Maximum) | Fan level direction | |

Remarks
If you would like to turn the fan level to 0 (OFF), you should transmit "Hvac_1st_Command=OFF".
If you would like to turn the fan level to AUTO, you should transmit "Hvac_1st_Command=ON".

3.4.2.17. Hvac_Fan_Level_2nd_Row_Command
Command to set the fan level on the rear AC
Values

TABLE 50

| value | Description | Remarks |
|---|---|---|
| 0 | No request | |
| 1 to 7 (Maximum) | Fan level direction | |

Remarks
If you would like to turn the fan level to 0 (OFF), you should transmit "Hvac_2nd_Command=OFF".
If you would like to turn the fan level to AUTO, you should transmit "Hvac_2nd_Command=ON".

3.4.2.18. Hvac_1st_Row_AirOutlet_Mode_Command
Command to set the mode of 1st row air outlet
Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks
N/A 3.4.2.19. Hvac_2nd_Row_AirOutlet_Mode_CommandCommand to set the mode of 2nd row air outlet
Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks
N/A 3.4.2.20. Hvac_Recirculate_Command
Command to set the air recirculation mode
Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks
N/A

3.4.2.21. Hvac_AC_Command

Command to set the AC mode

Values

TABLE 54

| value | Description | remarks |
|---|---|---|
| 00 | No request | |
| 01 | ON | means turning the AC mode ON |
| 02 | OFF | means turning the AC mode OFF |

Remarks
N/A

3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_1$^{st}$_Status | Status of activation of the 1$^{st}$ row HVAC | N/A |
| Hvac_2$^{nd}$_Status | Status of activation of the 2$^{nd}$ row HVAC | N/A |
| Hvac_Temperature_1$^{st}$_Left_Status | Status of set temperature of 1$^{st}$ row left | N/A |
| Hvac_Temperature_1$^{st}$_Right_Status | Status of set temperature of 1$^{st}$ row right | N/A |
| Hvac_Temperature_2$^{nd}$_Left_Status | Status of set temperature of 2$^{nd}$ row left | N/A |
| Hvac_Temperature_2$^{nd}$_Right_Status | Status of set temperature of 2$^{nd}$ row right | N/A |
| Hvac_Fan_Level_1$^{st}$_Row_Status | Status of set fan level of 1$^{st}$ row | N/A |
| Hvac_Fan_Level_2$^{nd}$_Row_Status | Status of set fan level of 2$^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status

Status of the current turnsignallight mode of the vehicle platform

Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks

At the time of the disconnection detection of the turn lamp, state is ON.

At the time of the short detection of the turn lamp, State is OFF.

3.4.3.2. Headlight_Mode_Status

Status of the current headlight mode of the vehicle platform

Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks

N/A

Detailed Design

At the time of tail signal ON, Vehicle Platform sends 1.

At the time of Lo signal ON, Vehicle Platform sends 2.

At the time of Hi signal ON, Vehicle Platform sends 4.

At the time of any signal above OFF, Vehicle Platform sends 0.

3.4.3.3. Hazardlight_Mode_Status

Status of the current hazard lamp mode of the vehicle platform

Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks

N/A

3.4.3.4. Horn_Status

Status of the current horn of the vehicle platform

Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks cannot detect any failure.

Vehicle platform sends "1" during Horn Pattern Command is active, if the horn is OFF.

3.4.3.5. Windshieldwiper_Mode_Front_Status

Status of the current front windshield wiper mode of the vehicle platform

Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks

Fail Mode Conditions detect signal discontinuity cannot detect except the above failure.

3.4.3.6. Windshieldwiper_Mode_Rear_Status

Status of the current rear windshield wiper mode of the vehicle platform

Values

TABLE 62

| Value | Description | Remarks |
|---|---|---|
| 0 | OFF | Rear wiper stopped |
| 1 | Lo | Rear wiper being in LO mode |

TABLE 62-continued

| Value | Description | Remarks |
|---|---|---|
| 2 | reserved | |
| 3 | INT | Rear wiper being in INT mode |
| 4-5 | reserved | |
| 6 | fail | Rear wiper failed |
| 7 | invalid | |

Remarks
cannot detect any failure.
3.4.3.7. Hvac_1st_Status
Status of activation of the 1st row HVAC
Values

TABLE 63

| value | Description | remarks |
|---|---|---|
| 0b | OFF | |
| 1b | ON | |

Remarks
N/A
3.4.3.8. Hvac_2nd_Status
Status of activation of the 2nd row HVAC
Values

TABLE 64

| value | Description | remarks |
|---|---|---|
| 0b | OFF | |
| 1b | ON | |

Remarks
N/A
3.4.3.9. Hvac_Temperature_1st_Left_Status
Status of set temperature of 1st row left
Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A
3.4.3.10. Hvac_Temperature_1st_Right_Status
Status of set temperature of 1st row right
Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A
3.4.3.11. Hvac_Temperature_2nd_Left_Status
Status of set temperature of 2nd row left
Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A
3.4.3.12. Hvac_Temperature_2nd_Right_Status
Status of set temperature of 2nd row right
Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A
3.4.3.13. Hvac_Fan_Level_1st_Row_Status
Status of set fan level of 1st row
Values

TABLE 69

| value | Description | remarks |
|---|---|---|
| 0 | OFF | |
| 1-7 | Fan Level | |
| 8 | Undefined | |

Remarks
N/A
3.4.3.14. Hvac Fan Level 2nd Row Status
Status of set fan level of 2nd row
Values

TABLE 70

| value | Description | remarks |
|---|---|---|
| 0 | OFF | |
| 1-7 | Fan Level | |
| 8 | Undefined | |

Remarks
N/A
3.4.3.15. Hvac_1st_Row_AirOutlet_Mode_Status
Status of mode of 1st row air outlet
Values

TABLE 71

| value | Description | remarks |
|---|---|---|
| 000b | ALL OFF | when Auto mode is set |
| 001b | UPPER | Air flows to the upper body |

TABLE 71-continued

| value | Description | remarks |
|---|---|---|
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks

N/A 3.4.3.16. Hvac_2nd_Row_AirOutlet_Mode_Status

Status of mode of 2nd row air outlet

Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks

N/A 3.4.3.17. Hvac_Recirculate_Status

Status of set air recirculation mode

Values

TABLE 73

| value | Description | remarks |
|---|---|---|
| 00 | OFF | means that the air recirculation mode is OFF |
| 01 | ON | means that the air recirculation mode is ON |

Remarks

N/A 3.4.3.18. Hvac_AC_Status

Status of set AC mode

Values

TABLE 74

| value | Description | remarks |
|---|---|---|
| 00 | OFF | means that the AC mode is OFF |
| 01 | ON | means that the AC mode is ON |

Remarks

N/A 3.4.3.19. 1st_Right_Seat_Occupancy_Status

Seat occupancy status in 1st left seat

Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks

When there is luggage on the seat, this signal may be set to "Occupied".

3.4.3.20. 1st_Left_Seat_Belt_Status

Status of driver's seat belt buckle switch

Values

TABLE 76

| value | Description | remarks |
|---|---|---|
| 0 | Buckled | |
| 1 | Unbuckled | |
| 2 | Undetermined | |
| 3 | Fault of a switch | |

Remarks

When Driver's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.21. 1st_Right_Seat_Belt_Status

Status of passenger's seat belt buckle switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks

When Passenger's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.22. 2nd_Left_Seat_Belt_Status

Seat belt buckle switch status in 2nd left seat

Values

TABLE 78

| value | Description | remarks |
|---|---|---|
| 0 | Buckled | |
| 1 | Unbuckled | |
| 2 | Undetermined | |
| 3 | Reserved | |

Remarks
cannot detect sensor failure.

3.4.3.23. 2nd_Right_Seat_Belt_Status
Seat belt buckle switch status in 2nd right seat
Values

TABLE 79

| value | Description | remarks |
|---|---|---|
| 0 | Buckled | |
| 1 | Unbuckled | |
| 2 | Undetermined | |
| 3 | Reserved | |

Remarks
cannot detect any failure.

3.5. APIs for Power Control 3.5.1. Functions
T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request
Command to control the power mode of the vehicle platform
Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks
Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Mode], which are controllable via API.

[Sleep]
Vehicle power off condition. In this mode, the high voltage battery does not supply power, and neither VCIB nor other VP ECUs are activated.

[Wake]
VCIB is awake by the low voltage battery. In this mode, ECUs other than VCIB are not awake except for some of the body electrical ECUs.

[Driving Mode]
Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status
Status of the current power mode of the vehicle platform
Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |
| 07 | unknown | means unhealthy situation would occur |

Remarks
VCIB will transmit [Sleep] as Power Mode Status continuously for 3000 [ms] after executing the sleep sequence. And then, VCIB will be shutdown.

3.6. APIs for Safety 3.6.1. Functions
T.B.D.

3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | — |
| Passive_Safety_Functions_Triggered | Collision detection signal | |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |

TABLE 85-continued

| Signal Name | Description | Redundancy |
|---|---|---|
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for operation according to status of vehicle platform toward ADS

Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks

T.B.D.

3.6.3.2. Passive_Safety_Functions_Triggered

Crash detection Signal

Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall send a voltage OFF request for 5 s or less after crash in HV vehicle.

Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System status

Values

TABLE 88

| value | Description | remarks |
|---|---|---|
| 0 | Normal | — |
| 1 | Failure detected | — |

Remarks

When the Failure is detected, Safe stop is moved.

3.6.3.4. Propulsive_System_Degradation_Modes

Indicate Powertrain_System status

Values

TABLE 89

| value | Description | remarks |
|---|---|---|
| 0 | Normal | — |
| 1 | Failure detected | — |

Remarks

When the Failure is detected, Safe stop is moved.

3.6.3.5. Direction_Control_Degradation_Modes

Indicate Direction_Control status

Values

TABLE 90

| value | Description | remarks |
|---|---|---|
| 0 | Normal | — |
| 1 | Failure detected | — |

Remarks

When the Failure is detected, Safe stop is moved.

When the Failure is detected, Propulsion Direction Command is refused.

3.6.3.6. WheelLock_Control_Degradation_Modes

Indicate WheelLock_Control status

Values

TABLE 91

| value | Description | remarks |
|---|---|---|
| 0 | Normal | — |
| 1 | Failure detected | — |

Remarks

Primary indicates EPB status, and Secondary indicates SBW indicates.

When the Failure is detected, Safe stop is moved.

3.6.3.7. Steering_System_Degradation_Modes

Indicate Steering_System status

Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks

When the Failure are detected, Safe stop is moved.

3.6.3.8. Power_System_Degradation_Modes
[T.B.D]

3.6.3.9. Communication_Degradation_Modes
[T.B.D]

3.7. APIs for Security

3.7.1. Functions
T.B.D.

3.7.2. Inputs

TABLE 93

| Signal Name | Description | Redundancy |
|---|---|---|
| 1st_Left_Door_Lock_Command | Command to control each door lock of the vehicle platform | N/A |
| 1st_Right_Door_Lock_Command | | N/A |
| 2nd_Left_Door_Lock_Command | Lock command supports only ALL Door Lock. | N/A |
| 2nd_Right_Door_Lock_Command | | N/A |
| | Unlock command supports 1st-left Door unlock only, and ALL Door unlock. | |
| | Trunk Door Lock/unlock command include in ALL Door lock/unlock | |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to control each door lock of the vehicle platform Values

TABLE 94

| Value | Description | Remarks |
|---|---|---|
| 0 | No Request | |
| 1 | Lock (unsupported) | |
| 2 | Unlock | |
| 3 | reserved | |

Remarks

Lock command supports only ALL Door Lock.

Unlock command supports 1st-left Door unlock only, and ALL Door unlock.

3.7.2.2. Central_Vehicle_Lock_Exterior_Command

Command to control the all door lock of the vehicle platform.

Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks

Lock command supports only ALL Door Lock.
Unlock command supports 1st-left Door unlock only, and ALL Door unlock.

3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status 5

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks cannot detect any failure.

3.7.3.2. 1st_Right_Door_Lock_Status

Status of the current 1st-right door lock mode of the vehicle platform

Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the current 2nd-left door lock mode of the vehicle platform

Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks cannot detect any failure.

3.7.3.4. 2nd_Right_Door_Lock_Status

Status of the current 2nd-right door lock mode of the vehicle platform

Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the current all door lock mode of the vehicle platform

Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status,
in case any door unlocked, sends 0.
in case all door locked, sends 1.

3.7.3.6. Vehicle_Alarm_Status

Status of the current vehicle alarm of the vehicle platform

Values

TABLE 102

| Value | Description | remarks |
|---|---|---|
| 0 | Disarmed | Auto alarm system not active |
| 1 | Armed | Auto alarm system active • not on alert |

TABLE 102-continued

| Value | Description | remarks |
|---|---|---|
| 2 | Active | Auto alarm system active • on alert |
| 3 | invalid | |

Remarks
N/A

3.8. APIs for MaaS Service 3.8.1. Functions
T.B.D.
3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| 2019 Nov. 4 | 0.1 | Creating a new material | MaaS Business Div. |

Index
1. General Concept 4
1.1. Purpose of this Specification 4
1.2. Target Vehicle Type 4
1.3. Target Electronic Platform 4
1.4. Definition of Term 4
1.5. Precaution for Handling 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
 3.3.1. The countermeasure for a remote attack 11
 3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 14
5. Function Allocation 15
5.1. in a healthy situation 15
5.2. in a single failure 16
6. Data Collection 18
6.1. At event 18
6.2. Constantly 18
1. General Concept

1.1. Purpose of this Specification

This document is an architecture specification of Toyota's MaaS Vehicle Platform and contains the outline of system in vehicle level.

1.2. Target Vehicle Type

This specification is applied to the Toyota vehicles with the electronic platform called 19ePF [ver.1 and ver.2].
The representative vehicle with 19ePF is shown as follows. e-Palette, Sienna, RAV4, and so on.

1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.
2. Architectural Concept

2.1. Overall Structure of MaaS

Figure 14:
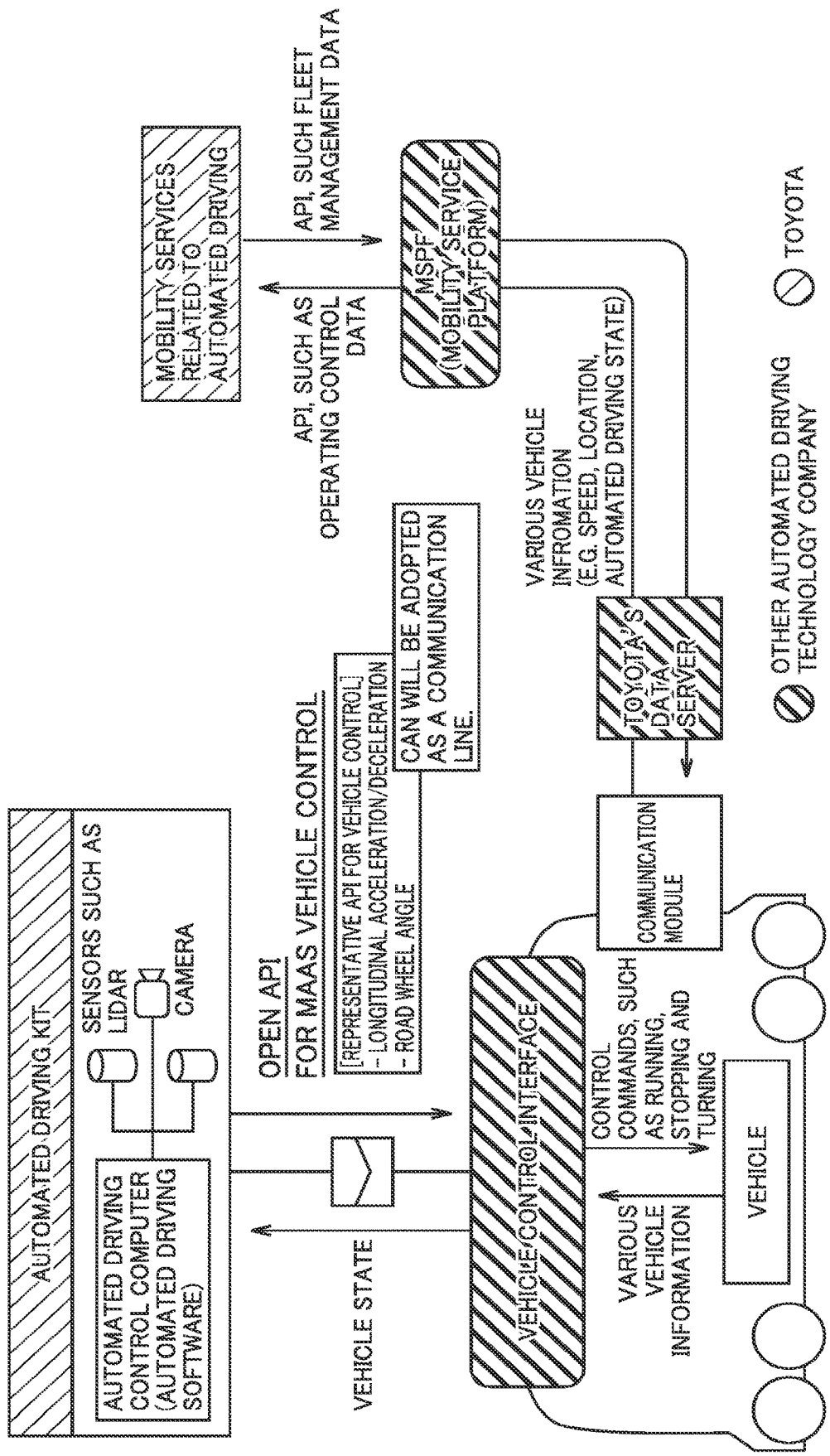
FIG. 14 is a diagram of an overall configuration of MaaS.

The overall structure of MaaS with the target vehicle is shown (FIG. 14).
Vehicle control technology is being used as an interface for technology providers.
Technology providers can receive open API such as vehicle state and vehicle control, necessary for development of automated driving systems.

2.2. Outline of System Architecture on the Vehicle

Figure 15:
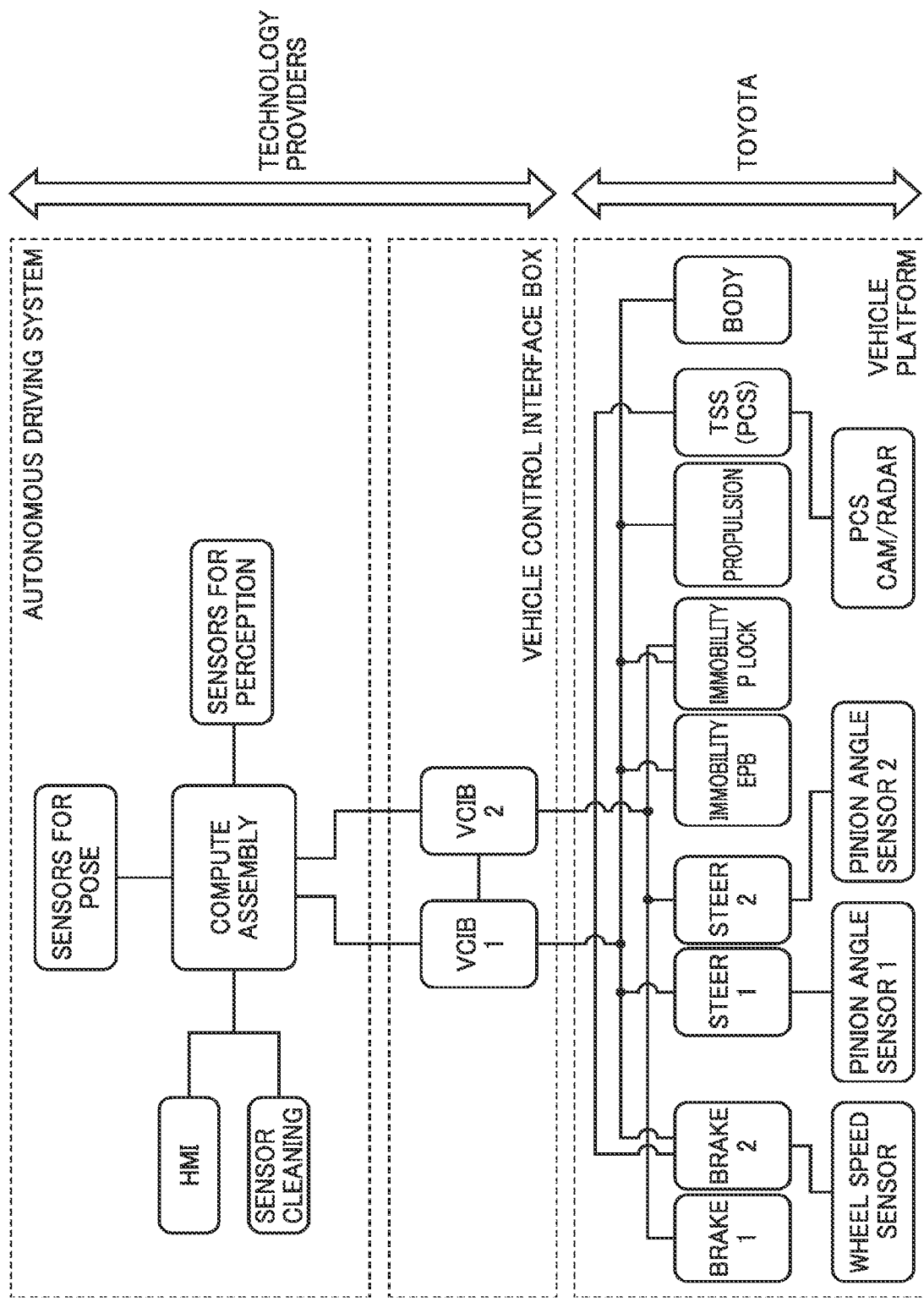
FIG. 15 is a diagram of a system configuration of a vehicle.

The system architecture on the vehicle as a premise is shown (FIG. 15).
The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 16:
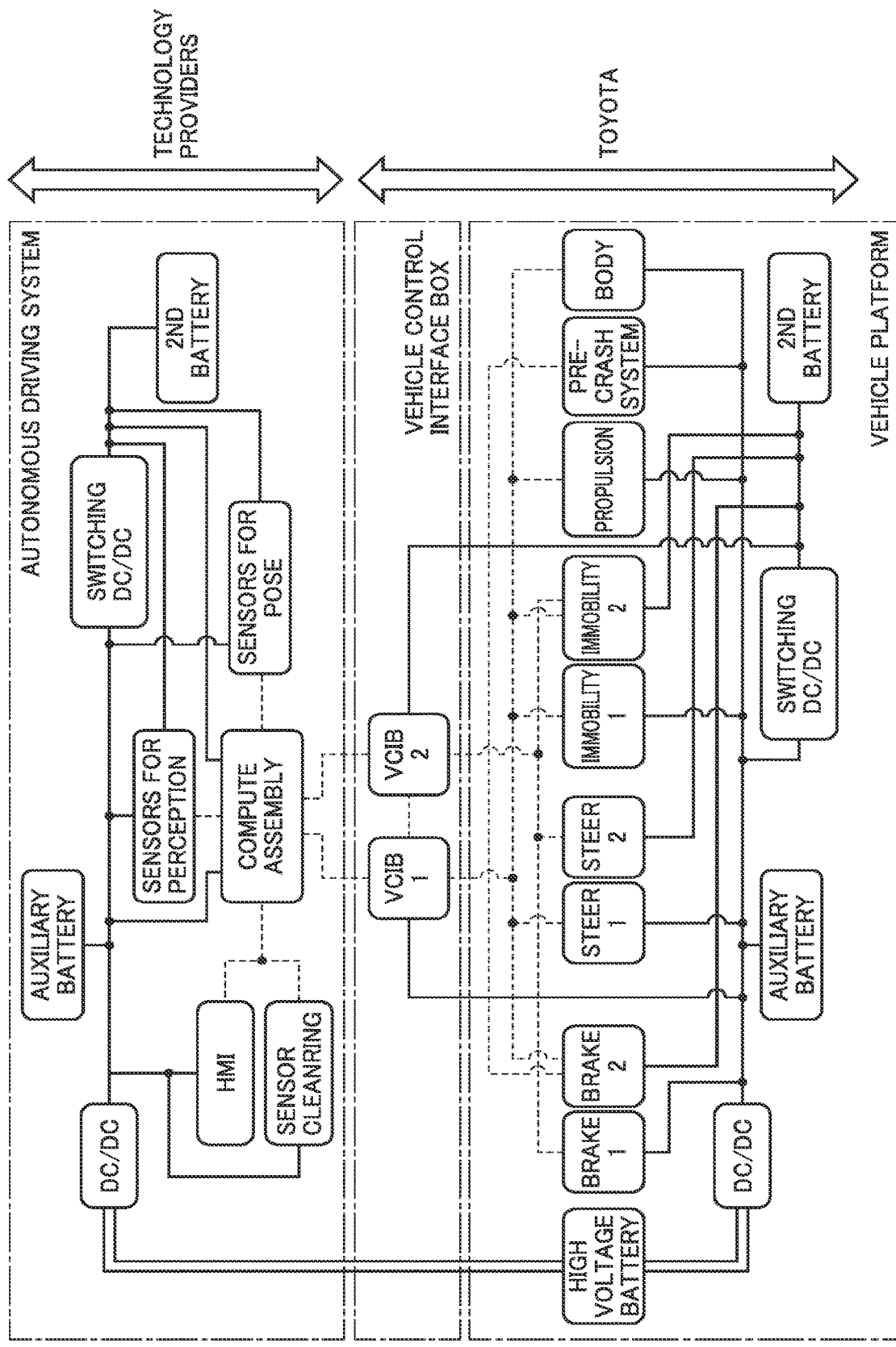
FIG. 16 is a diagram showing a configuration of supply of power of the vehicle.

The power supply architecture as a premise is shown as follows (FIG. 16).

The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept

3.1. Overall Safety Concept

The basic safety concept is shown as follows.

Figure 17:
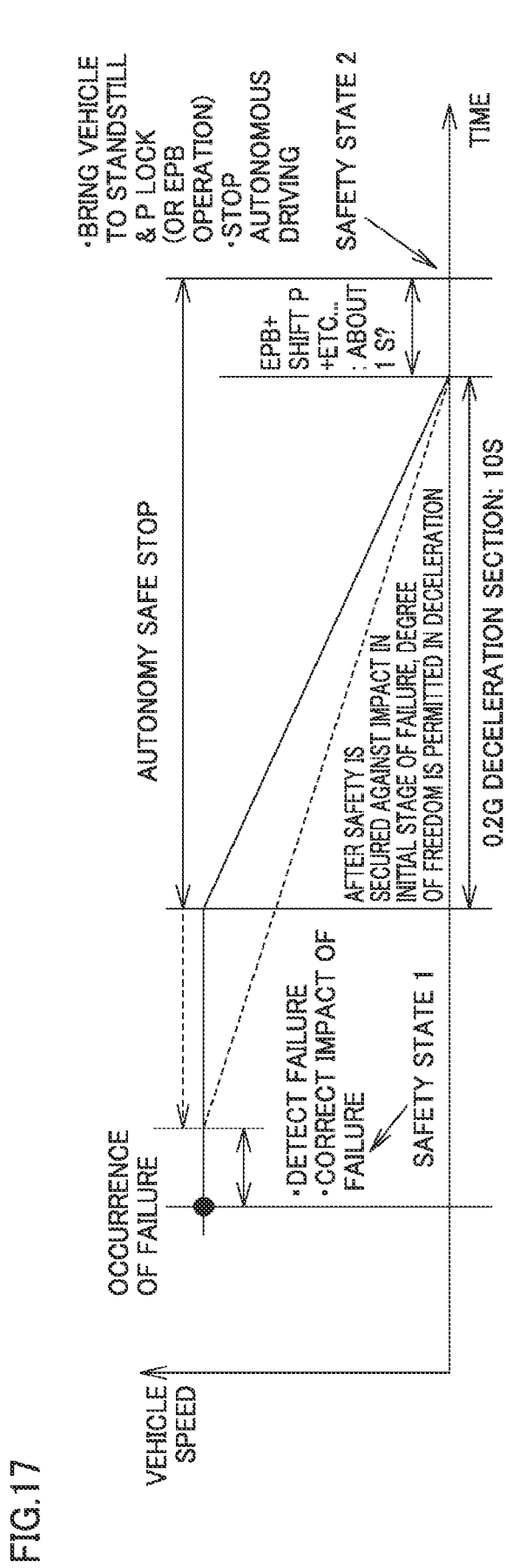
FIG. 17 is a diagram illustrating strategies until the vehicle is safely brought to a standstill at the time of occurrence of a failure.

The strategy of bringing the vehicle to a safe stop when a failure occurs is shown as follows (FIG. 17).

1. After occurrence of a failure, the entire vehicle executes "detecting a failure" and "correcting an impact of failure" and then achieves the safety state 1.

2. Obeying the instructions from the ADS, the entire vehicle stops in a safe space at a safe speed (assumed less than 0.2G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
|---|---|
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept

4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.

[Remote Attack]
To vehicle
  Spoofing the center
  ECU Software Alternation
  DoS Attack
  Sniffing
From vehicle
  Spoofing the other vehicle
  Software Alternation for a center or an ECU on the other vehicle
  DoS Attack to a center or other vehicle
  Uploading illegal data
[Modification]
Illegal Reprogramming
Setting up an illegal ADK
Installation of an unauthenticated product by a customer

4.3. Countermeasure for the Risks

The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation 5.1. In a Healthy Situation

Figure 18:
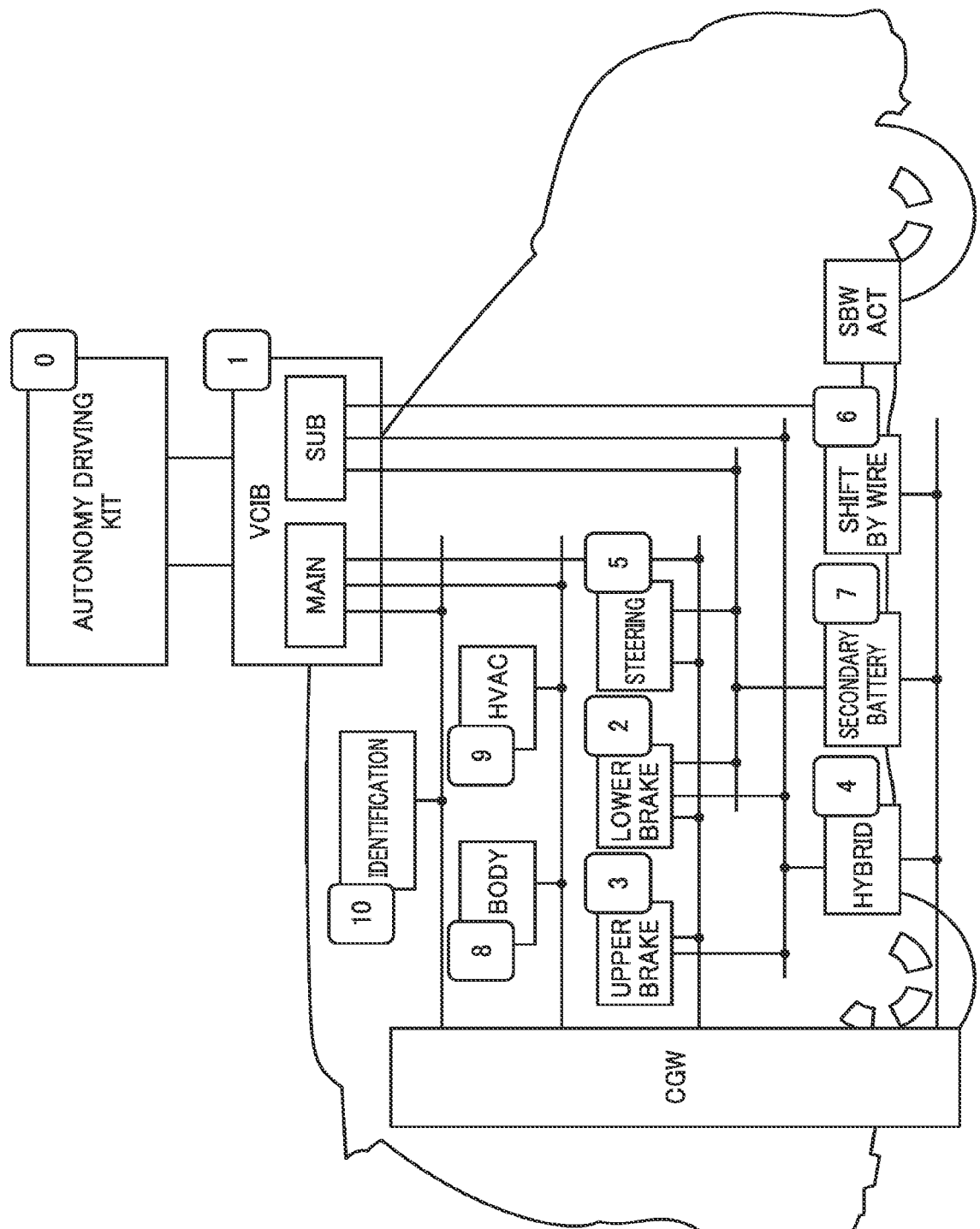
FIG. 18 is a diagram showing arrangement of representative functions of the vehicle.

The allocation of representative functionalities is shown as below (FIG. 18).

[Function Allocation]

TABLE 108

| Function category | Function name | Related to # | remarks |
| --- | --- | --- | --- |
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/ Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |

TABLE 108-continued

| Function category | Function name | Related to # | remarks |
| --- | --- | --- | --- |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle system capable of autonomous driving, the vehicle system comprising:
   an autonomous driving kit attachable to and removable from the vehicle, the autonomous driving kit issuing an instruction for autonomous driving;
   a vehicle platform that has a function of steering the vehicle; and
   a vehicle control interface box that communicates with the autonomous driving kit and issues a control instruction to the vehicle platform in accordance with an instruction from the autonomous driving kit, the autonomous driving kit being connected to the vehicle platform via the vehicle control interface box by a controller area network (CAN), wherein
   the vehicle platform
      specifies a limit value of a steering rate in accordance with a prescribed reference, and
      transmits the specified limit value to the autonomous driving kit through the vehicle control interface box, and
   the autonomous driving kit
      calculates a target steering angle to satisfy the limit value received from the vehicle platform, and
      transmits an instruction for the calculated steering angle to the vehicle platform through the vehicle control interface box.

2. The vehicle system according to claim 1, wherein the vehicle platform switches the prescribed reference in accordance with a vehicle speed.

3. The vehicle system according to claim 2, wherein the prescribed reference is a reference that the limit value of the steering rate is defined as a prescribed angular velocity when the vehicle speed is lower than a prescribed speed.

4. The vehicle system according to claim 3, wherein a value of the prescribed angular velocity is 0.4 rad/s.

5. The vehicle system according to claim 2, wherein the prescribed reference is a reference that, when the vehicle speed exceeds a prescribed speed, the limit value of the steering rate satisfies predetermined relation between the vehicle speed and the limit value of the steering rate.

6. The vehicle system according to claim 5, wherein
a value of the prescribed speed is 10 km/h.

7. The vehicle system according to claim 2, wherein
the prescribed reference is a reference determined in advance to set a lateral jerk of the vehicle to be lower than a prescribed jerk.

8. The vehicle system according to claim 7, wherein
a value of the prescribed jerk is 2.94 m/s3.

9. An autonomous driving kit that is attachable to and removable from a vehicle and issues an instruction for autonomous driving of the vehicle, the vehicle that has a function of steering the vehicle, the vehicle being controlled in accordance with an instruction from the autonomous driving kit, the autonomous driving kit being connected to the vehicle via a controller area network (CAN), wherein the autonomous driving kit is configured to
calculate a target steering angle to satisfy a limit value of a steering rate specified by the vehicle in accordance with a prescribed reference, and
transmit an instruction for the calculated steering angle to the vehicle.

10. The autonomous driving kit according to claim 9, wherein
the vehicle platform switches the prescribed reference in accordance with a vehicle speed.

11. The autonomous driving kit according to claim 10, wherein
the prescribed reference is a reference that the limit value of the steering rate is defined as a prescribed angular velocity when the vehicle speed is lower than a prescribed speed.

12. The autonomous driving kit according to claim 11, wherein a value of the prescribed angular velocity is 0.4 rad/s.

13. The autonomous driving kit according to claim 10, wherein
the prescribed reference is a reference that, when the vehicle speed exceeds a prescribed speed, the limit value of the steering rate satisfies predetermined relation between the vehicle speed and the limit value of the steering rate.

14. The autonomous driving kit according to claim 10, wherein
the prescribed reference is a reference determined in advance to set a lateral jerk of the vehicle to be lower than a prescribed jerk.

15. A vehicle capable of autonomous driving, the vehicle comprising:
a vehicle platform that has a function of steering the vehicle; and
a vehicle control interface box, the vehicle control interface box communicating with an autonomous driving kit that issues an instruction for autonomous driving and is attachable to and removable from the vehicle, the vehicle control interface box issuing a control instruction to the vehicle platform in accordance with an instruction from the autonomous driving kit, the autonomous driving kit being connected to the vehicle platform via the vehicle control interface box by a controller area network (CAN), wherein
the vehicle platform
specifies a limit value of a steering rate in accordance with a prescribed reference,
transmits the specified limit value to the autonomous driving kit through the vehicle control interface box, and
controls a steering angle in accordance with an instruction for a target steering angle calculated by the autonomous driving kit to satisfy the limit value received from the vehicle platform.

16. The vehicle according to claim 15, wherein
the vehicle platform switches the prescribed reference in accordance with a vehicle speed.

17. The vehicle according to claim 16, wherein
the prescribed reference is a reference that the limit value of the steering rate is defined as a prescribed angular velocity when the vehicle speed is lower than a prescribed speed.

18. The vehicle according to claim 17, wherein
a value of the prescribed angular velocity is 0.4 rad/s.

19. The vehicle according to claim 16, wherein
the prescribed reference is a reference that, when the vehicle speed exceeds a prescribed speed, the limit value of the steering rate satisfies predetermined relation between the vehicle speed and the limit value of the steering rate.

20. The vehicle according to claim 16, wherein
the prescribed reference is a reference determined in advance to set a lateral jerk of the vehicle to be lower than a prescribed jerk.

* * * * *